United States Patent [19]

Tateno et al.

[11] Patent Number: 4,732,246

[45] Date of Patent: Mar. 22, 1988

[54] AUTOMATIC TRANSMISSION APPARATUS FOR VEHICLE

[75] Inventors: Toshiaki Tateno; Shigeki Fukushima; Osamu Ihara, all of Yokohama; Tomoyuki Iwamoto, Kawasaki, all of Japan

[73] Assignee: Mitsubishi Jidosha Kogyo Kabushiki Kaisha, Tokyo, Japan

[21] Appl. No.: 807,897

[22] PCT Filed: Mar. 15, 1985

[86] PCT No.: PCT/JP85/00130

§ 371 Date: Nov. 15, 1985

§ 102(e) Date: Nov. 15, 1985

[87] PCT Pub. No.: WO85/04225

PCT Pub. Date: Sep. 26, 1986

[30] Foreign Application Priority Data

| Mar. 16, 1984 | [JP] | Japan | 59-50747 |
| Apr. 19, 1984 | [JP] | Japan | 59-57514 |
| Apr. 19, 1984 | [JP] | Japan | 59-57516 |
| Apr. 19, 1984 | [JP] | Japan | 59-57517 |
| Jun. 30, 1984 | [JP] | Japan | 59-99588 |
| Sep. 27, 1984 | [JP] | Japan | 59-145992 |
| Sep. 27, 1984 | [JP] | Japan | 59-145997 |
| Oct. 12, 1984 | [JP] | Japan | 59-153129 |
| Oct. 12, 1984 | [JP] | Japan | 59-153130 |
| Oct. 12, 1984 | [JP] | Japan | 59-153133 |
| Oct. 15, 1984 | [JP] | Japan | 59-155375 |

[51] Int. Cl.⁴ ............... B60K 41/28; B60K 41/02; B60K 41/08

[52] U.S. Cl. ............... 192/0.052; 192/0.073; 192/0.076; 192/0.08; 192/4 B; 74/336 R; 74/858; 74/866; 74/872

[58] Field of Search ............... 192/0.052, 0.07, 0.073, 192/0.075, 0.076, 0.08, 0.092, 0.096, 4 A, 4 B, 9, 30 W; 74/336 R, 858, 859, 860, 866, 872; 364/424.1; 180/271

[56] References Cited

U.S. PATENT DOCUMENTS

| 2,532,945 | 12/1950 | Robinson | 192/0.07 |
| 2,949,104 | 8/1960 | Davis | 123/179 B |
| 3,628,642 | 12/1971 | Rauenel | 74/866 X |
| 3,631,950 | 1/1972 | Takana | 192/4 A |
| 4,079,638 | 3/1978 | Sibeud | 74/866 |
| 4,140,031 | 2/1979 | Sibeud et al. | 74/336 R |
| 4,172,505 | 10/1979 | Rabus et al. | 74/862 X |
| 4,194,608 | 3/1980 | Usui et al. | 192/0.092 |
| 4,223,573 | 9/1980 | Franssen | 74/866 X |
| 4,295,551 | 10/1981 | Zimmermann et al. | 74/866 |
| 4,343,387 | 8/1982 | Hofbauer | 192/0.076 |
| 4,344,513 | 8/1982 | Etienne | 192/0.092 |
| 4,361,060 | 11/1982 | Smyth | 74/866 |
| 4,363,973 | 12/1982 | Kawata et al. | 307/10 R |
| 4,378,710 | 4/1983 | Knödel | 74/339 |
| 4,393,732 | 7/1983 | Suzuki et al. | 74/866 |
| 4,493,228 | 1/1985 | Vukovich et al. | 74/866 |
| 4,509,625 | 4/1985 | Tellert | 192/0.052 X |

FOREIGN PATENT DOCUMENTS

| 2125178 | 11/1972 | Fed. Rep. of Germany | 192/30 W |
| 3100465 | 12/1981 | Fed. Rep. of Germany | . |
| 3243485 | 7/1983 | Fed. Rep. of Germany | 192/0.092 |
| 3243461 | 7/1983 | Fed. Rep. of Germany | . |
| 26021 | 7/1978 | Japan | . |
| 22725 | 5/1981 | Japan | . |
| 57-138832 | 8/1982 | Japan | . |
| 57-144735 | 9/1982 | Japan | . |
| 160724 | 10/1982 | Japan | . |
| 134232 | 8/1983 | Japan | . |
| 26627 | 2/1984 | Japan | . |
| 558898 | 1/1944 | United Kingdom | 192/0.07 |

Primary Examiner—Rodney H. Bonck
Assistant Examiner—David A. Testardi
Attorney, Agent, or Firm—Birch, Stewart, Kolasch, & Birch

[57] ABSTRACT

A first clutch control is operated in response to an accelerator position signal so as to set a clutch from a disengaged state to a half engaged state. A second clutch control is provided for gradually engaging the clutch when a load signal from an engine load detecting is equal to or higher than a preset value, and for disengaging the clutch when the signal is higher than the preset value. After the second clutch control is operated when a difference between an engine speed and a clutch output shaft speed becomes equal to or lower than a predetermined value, the clutch is fully engaged by a third clutch control.

14 Claims, 30 Drawing Figures

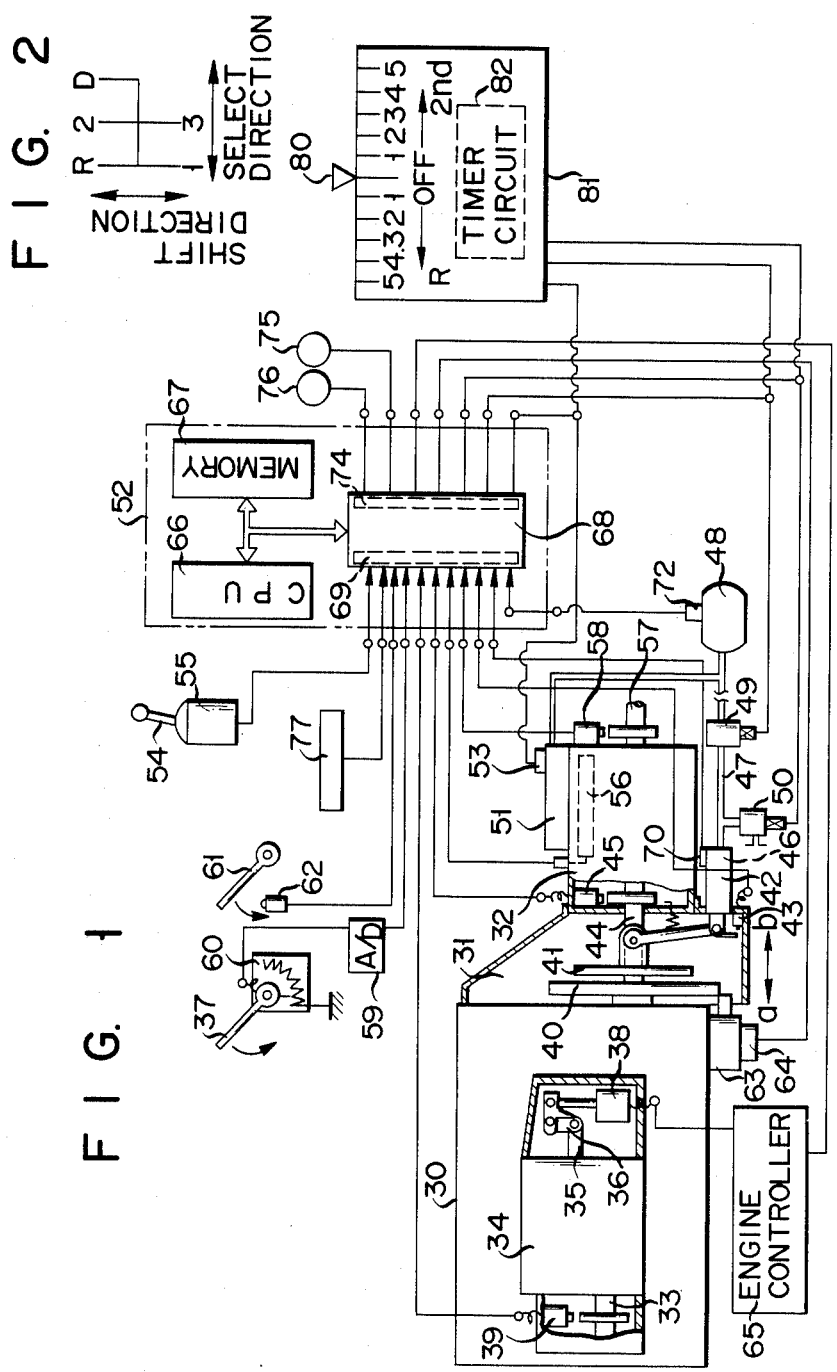

F I G. 15
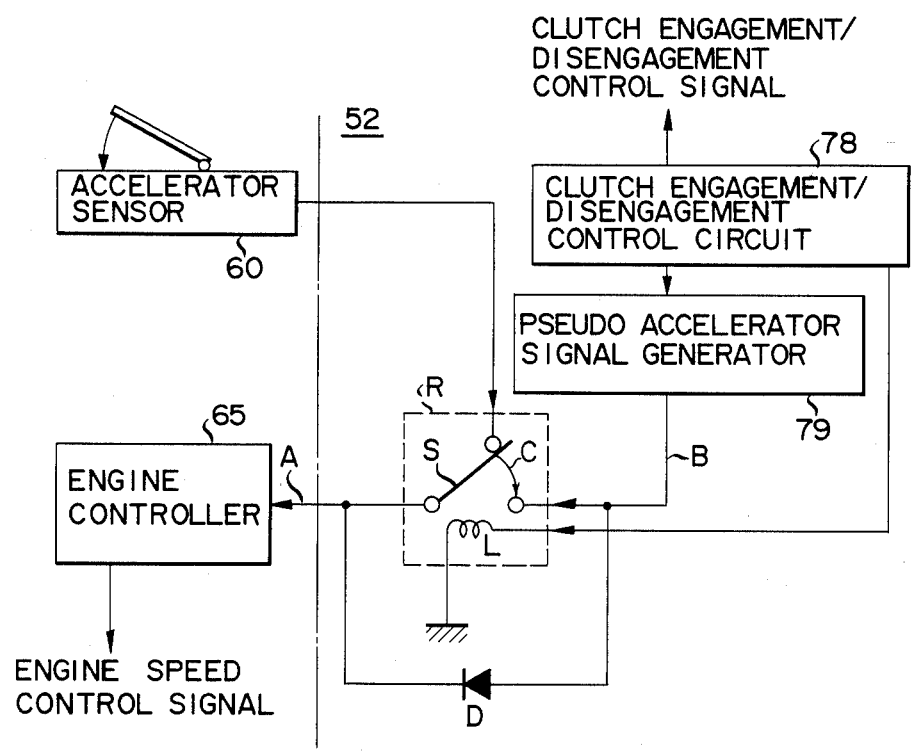

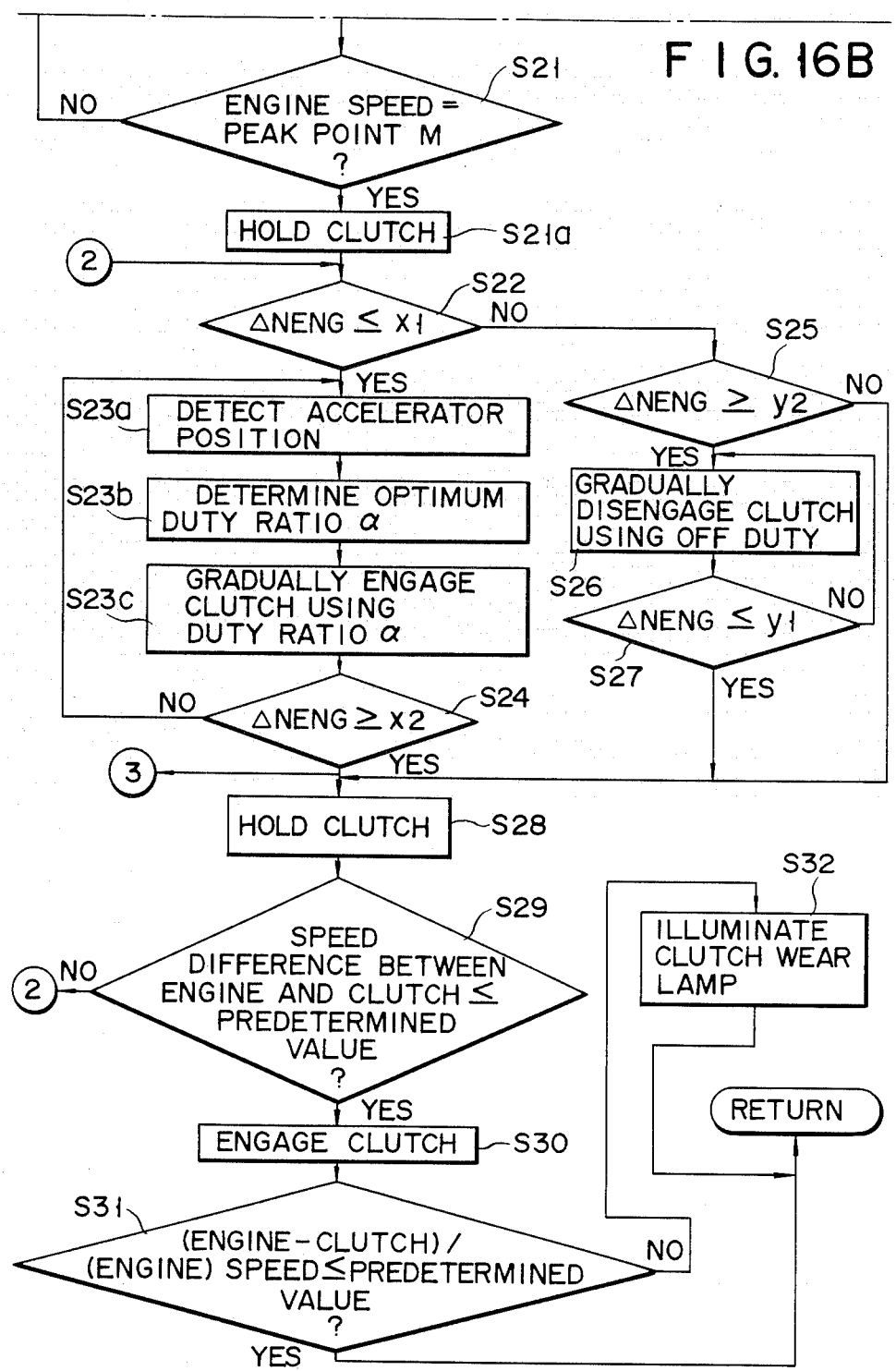

F I G. 19
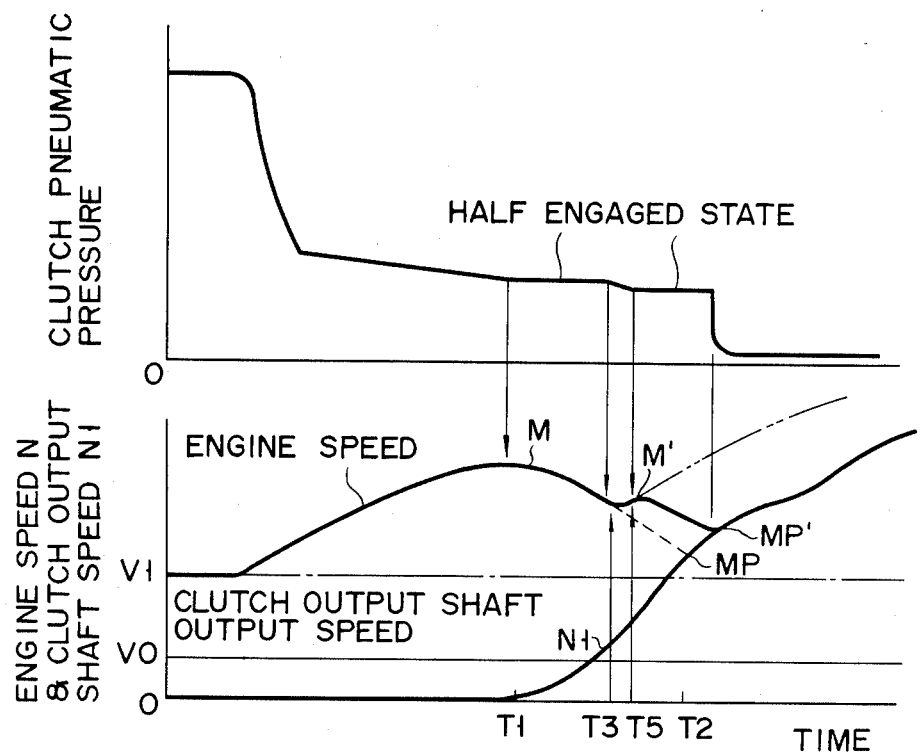

F I G. 20
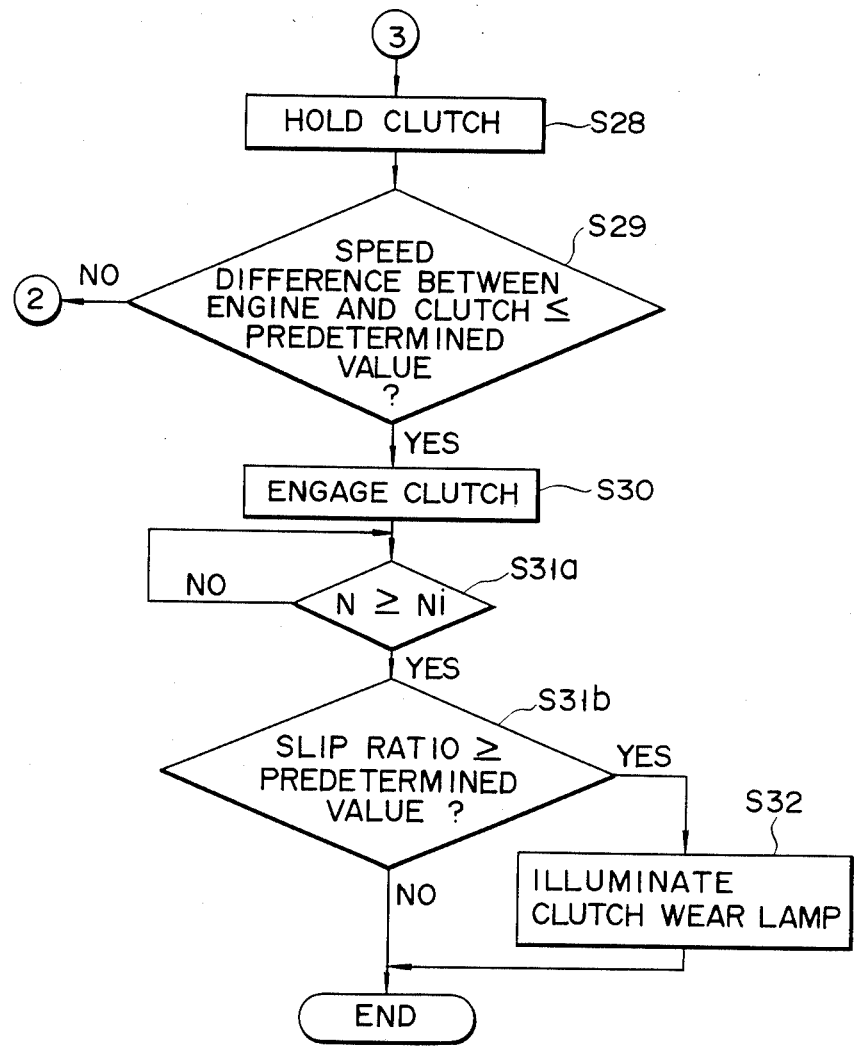

F I G. 23
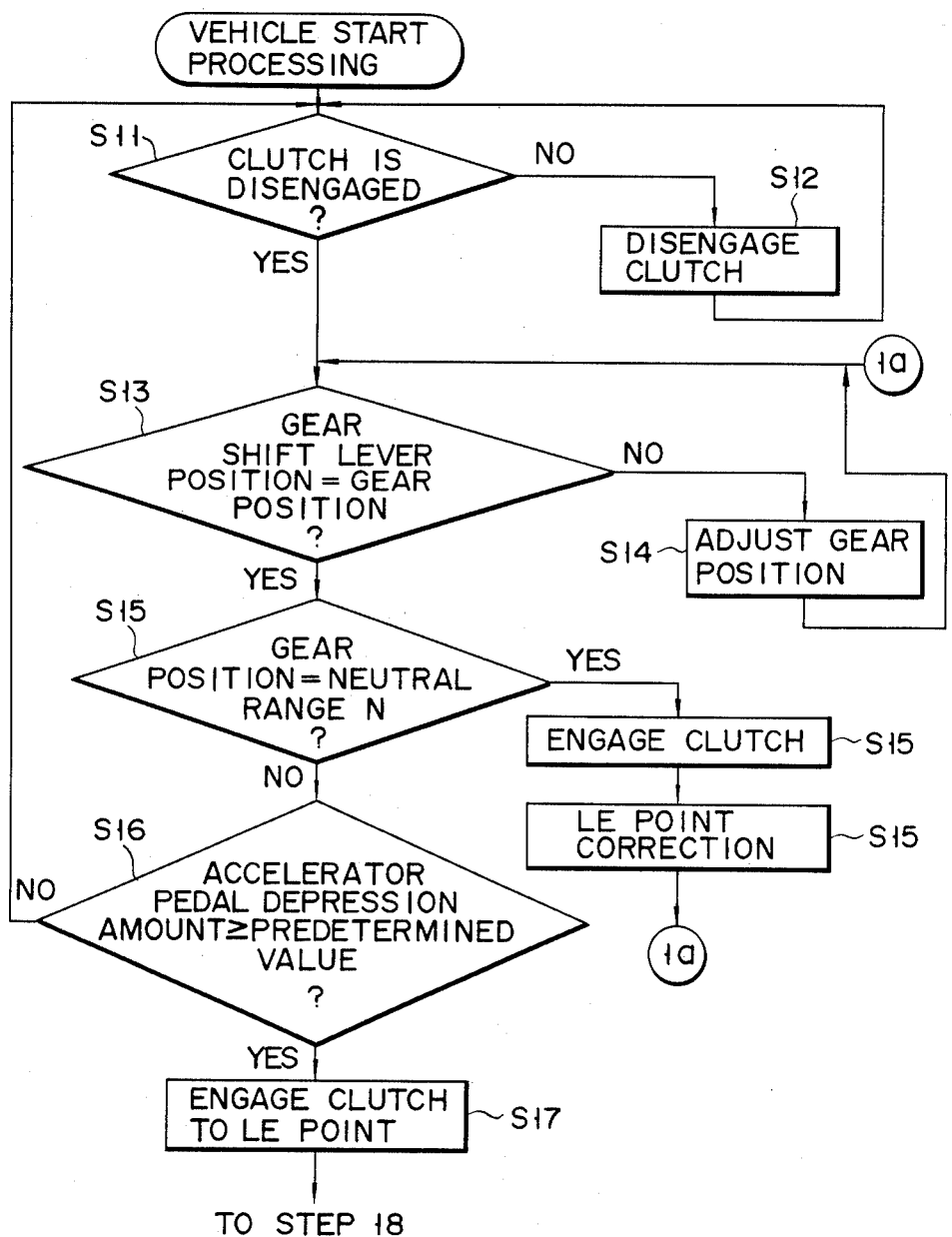

AUTOMATIC TRANSMISSION APPARATUS FOR VEHICLE

TECHNICAL FIELD

The present invention relates to an automatic transmission apparatus which performs switching control of a gear position of a transmission, in addition to engagement/disengagement control of a clutch, in accordance with a vehicle speed.

BACKGROUND ART

Conventionally, a gear shift unit for finger touch control is known wherein a driver manually operates a gear shift lever. A transmission signal obtained therefrom is processed by a control box so as to supply a predetermined operation signal to the gear shift unit, and the unit switches a transmission using a booster driven by a pneumatic pressure. A gear shift unit of this type is disclosed in specifications and drawings of Japanese Utility Model Application Nos. 57-144735 and 57-138832. Such an apparatus can reduce fatigue of the driver since force to operate the transmission can be decreased. However, the clutch must be engaged/disengaged by the driver in the case of a transmission switching operation.

DISCLOSURE OF INVENTION

The present invention has been made in consideration of the above situation, and has, as its object, to provide an automatic transmission apparatus which needs no clutch engagement/disengagement operation by a driver, and can automatically drive a clutch and a transmission.

According to the present invention, there is provided an automatic transmission apparatus for a vehicle, characterized by comprising a parallel shaft type gear automatic transmission connected through a clutch to an engine mounted on a vehicle, an actuator for engaging-/diseengaging the clutch, actuator control means for controlling an operation of the actuator, clutch position detecting means for detecting engagement/disengagement of the clutch, transmission position detecting means for generating a signal corresponding to a transmission position of the parallel shaft type gear automatic transmission, transmission position switching means for changing the meshing state of the parallel shaft type gear automatic transmission, operating condition detecting means for detecting operating conditions of at least one of the vehicle, the engine or the parallel shaft type gear automatic transmission, transmission position selecting means for supplying a transmission signal to the transmission position switching means so as to shift the parallel shaft type gear automatic transmission to a target transmission position in accordance with an operation by a driver, and automatic transmission control means comprising at least load detecting means for detecting a load state of the engine, first clutch control means for operating the actuator control means so as to actuate the clutch from a disengaged state to a half engaged state in accordance with an accelerator position signal from the operating condition detecting means, second clutch control means for operating the actuator control means so as to gradually engage the clutch when a load signal from the load detecting means is below a preset value after operation of the first clutch control means, and to disengage the clutch so as to reduce the load of the engine when the preset value is exceeded, and third clutch control means for operating the actuator control means so as to fully engage the clutch when the difference between an engine speed and an output shaft speed of the clutch, detected by the operating condition detecting means, becomes lower than a predetermined value after operation of the second clutch control means.

Furthermore, according to the present invention, there is provided an automatic transmission apparatus for a vehicle, characterized by comprising a parallel shaft type gear automatic transmission connected through a clutch to an engine mounted on a vehicle, an actuator for engaging/disengaging the clutch, actuator control means for controlling an operation of the actuator, clutch position detecting means for detecting engagement/disengagement of the clutch, transmission position detecting means for generating a signal corresponding to a transmission position of the parallel shaft type gear automatic transmission, transmission position switching means for changing the meshing state of the parallel shaft type gear automatic transmission, operating condition detecting means for detecting operating conditions of at least one of the vehicle, the engine or the parallel shaft type gear automatic transmission; a transmission operation lever for selecting a selective transmission range for determining both an optimum transmission position from an accelerator pedal position and an engine speed from the operating condition detecting means so as to automatically switch the parallel shaft type gear automatic transmission, and a designation transmission range for switching the parallel shaft type gear automatic transmission to a designated transmission position; and automatic transmission control means having transmission position selecting means for supplying a transmission signal to the transmission position switching means so as to switch the parallel shaft type gear automatic transmission to a target transmission position, and for operating the actuator control means so as to move the clutch to a disengaged position to hold an engine speed, supplying, to the transmission position switching means, a signal for shifting a transmission range down, one by one, when an operation signal from the transmission operation lever is changed from the selective transmission range to the designation transmission range; and coincidence control means for supplying a signal to the engine and the actuator control means to cause the engine speed and the speed of the clutch to substantially coincide with each other so as to fully engage the clutch when the transmission position detecting means detects, by the signal from the transmission position selecting means, that the transmission operation is completed.

Furthermore, according to the present invention, there is provided an automatic transmission apparatus for a vehicle, characterized by comprising a parallel shaft type gear automatic transmission connected through a clutch to an engine mounted on a vehicle, an actuator for engaging/disengaging the clutch, actuator control means for controlling an operation of the actuator, clutch position detecting means for detecting engagement/disengagement of the clutch, transmission position detecting means for generating a signal corresponding to a transmission position of the parallel shaft type gear automatic transmission, transmission position switching means for changing a meshing state of the parallel shaft type gear automatic transmission, operating condition detecting means for detecting operating conditions of at least one of the vehicle, the engine or the parallel shaft type gear automatic transmission; a transmission operation lever for selecting a selective transmission range for determining both an optimum transmission position from an accelerator pedal position and an engine speed from the operating condition detecting means so as to automatically switch the parallel shaft type gear automatic transmission, and a designation transmission range for switching the parallel shaft type gear automatic transmission to a designated transmission position; automatic transmission control means having transmission position selecting means for supplying a transmission signal to the transmission position switching means so as to switch the parallel shaft type gear automatic transmission to a target transmission position in accordance with an operation signal from the transmission operation lever, and clutch control means for supplying a signal to the actuator control means so as to disengage the clutch, by the transmission signal, and to fully engage the clutch when the transmission position detecting means detects that the transmission operation is completed; and emergency operation means, manually operated when the automatic transmission control means malfunctions, for independently operating the actuator control means and the transmission position switching means.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTIOON OF THE DRAWINGS

The present invention will become more fully understood from the detailed description given hereinbelow and the accompanying drawings which are given by way of illustration only, and thus are not limitative of the present invention, and wherein:

FIG. 1 is a schematic view showing an automatic transmission apparatus according to a first embodiment of the present invention;

FIG. 2 is a diagram showing a shift pattern of the automatic transmission apparatus;

FIG. 15 is a partial detailed diagram showing a control unit 52;

Figure 16A:
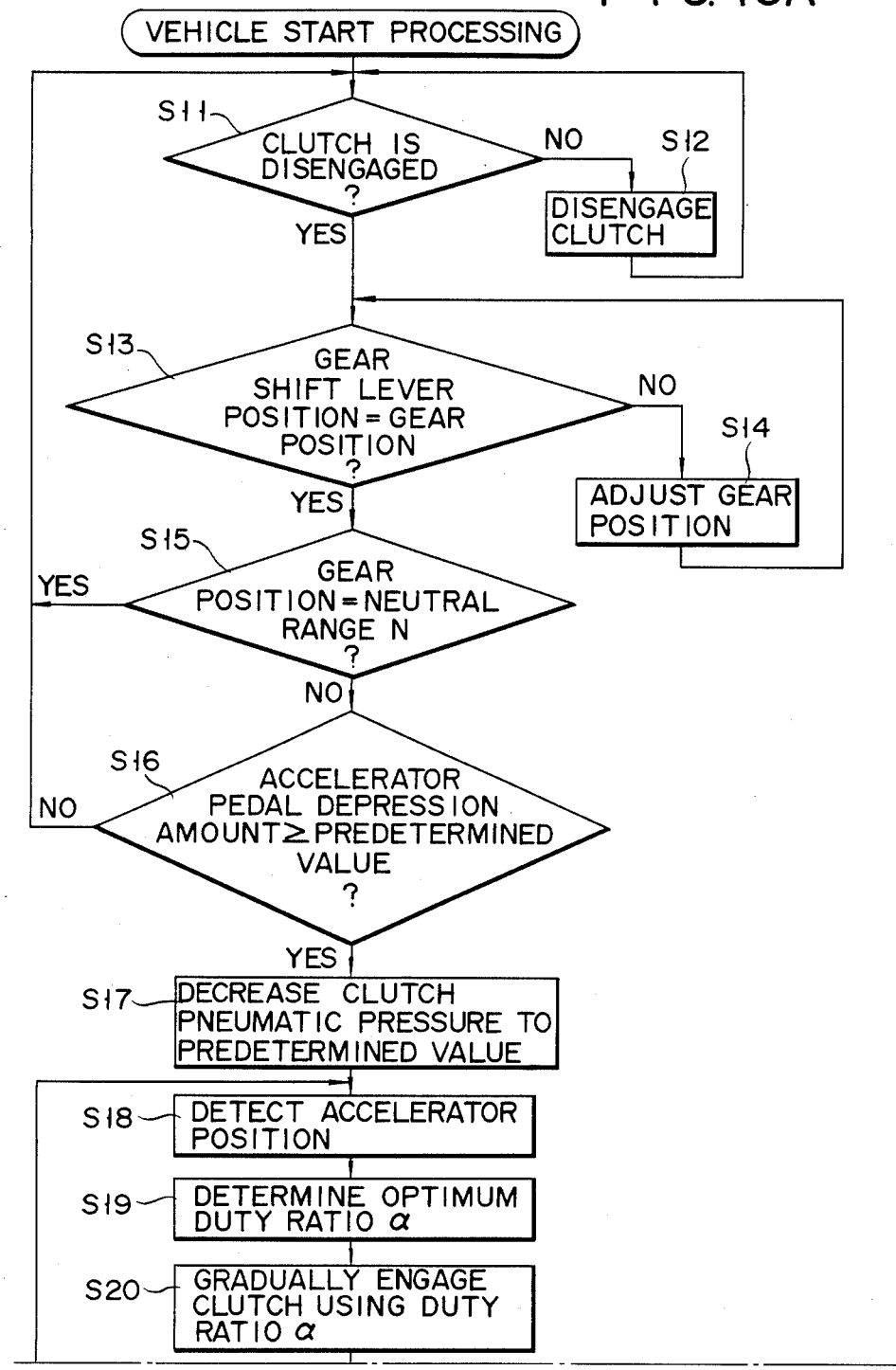
Figure 17:
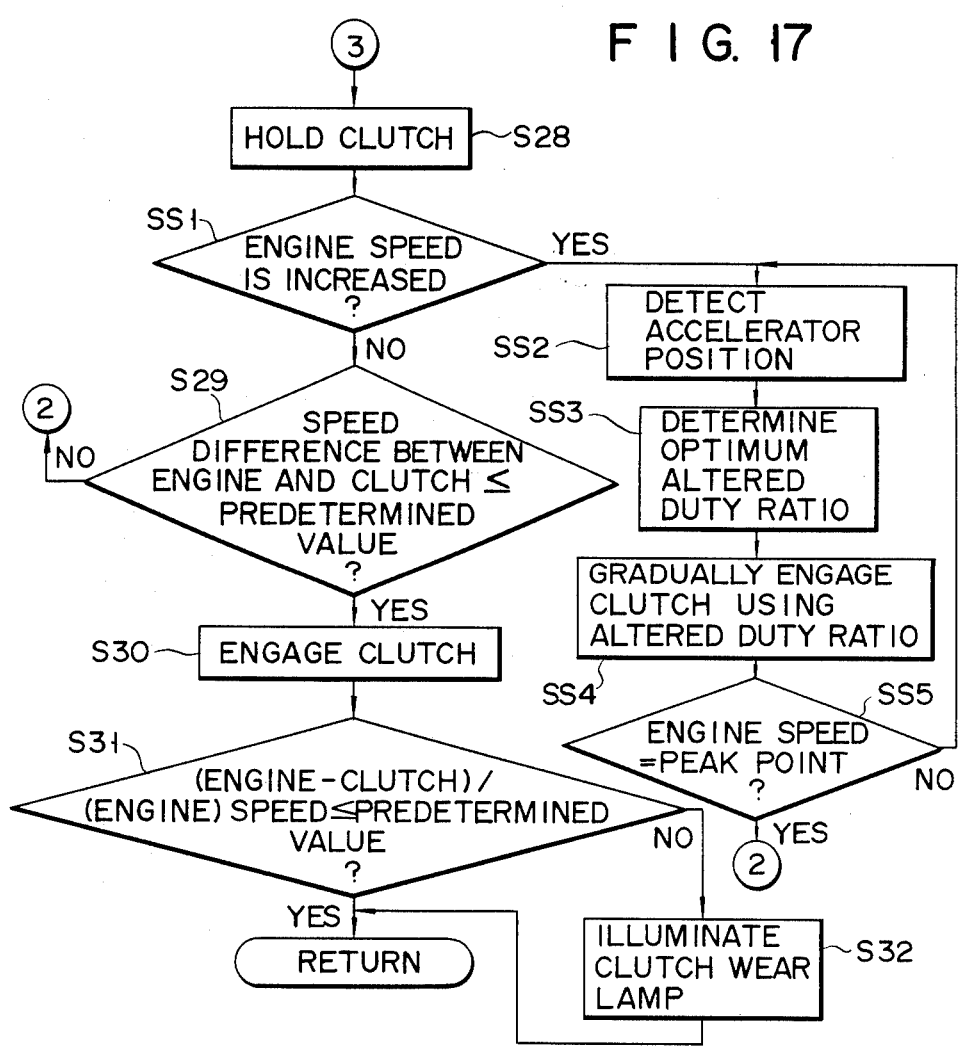
Figure 18:
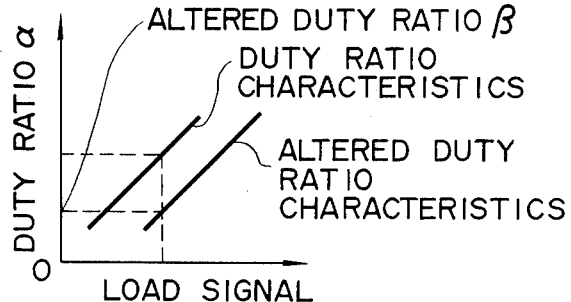
Figure 21:
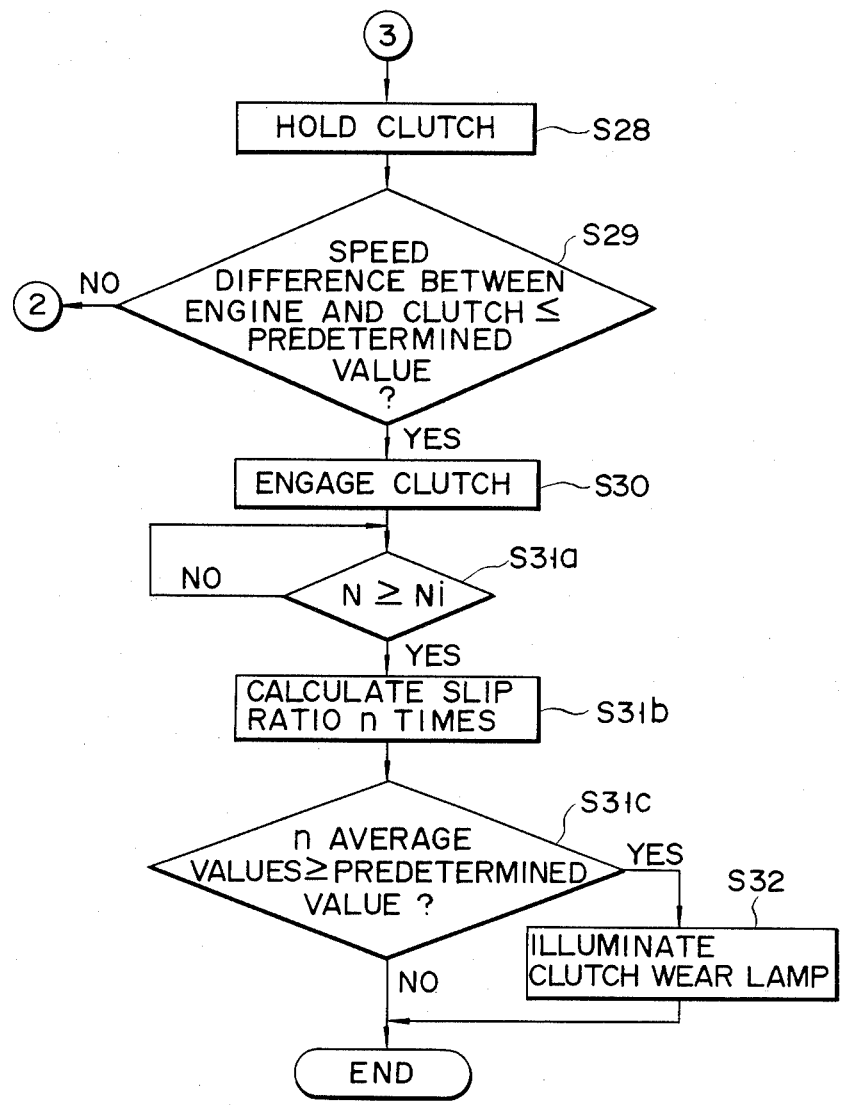
Figure 22:
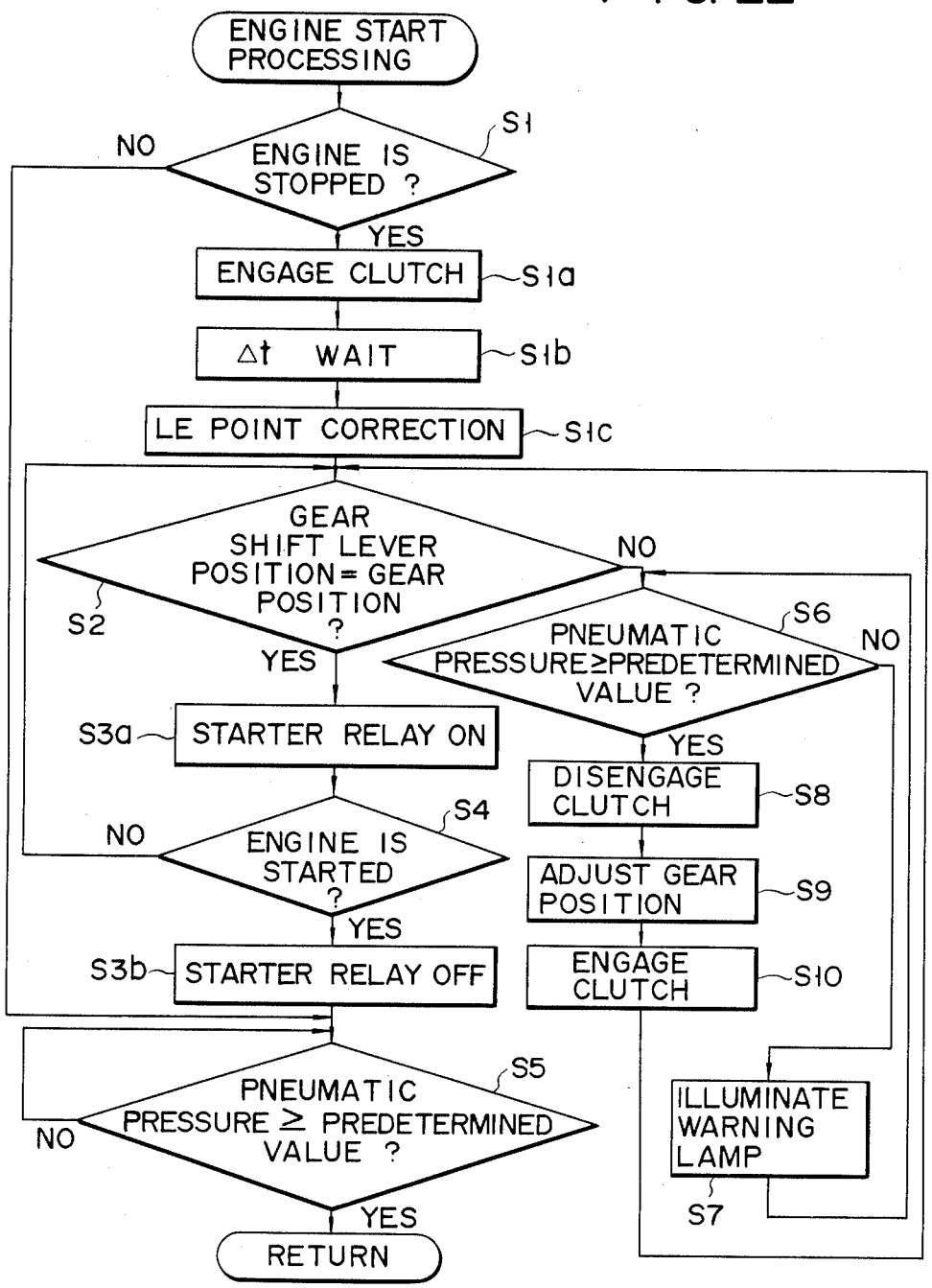
Figure 24:
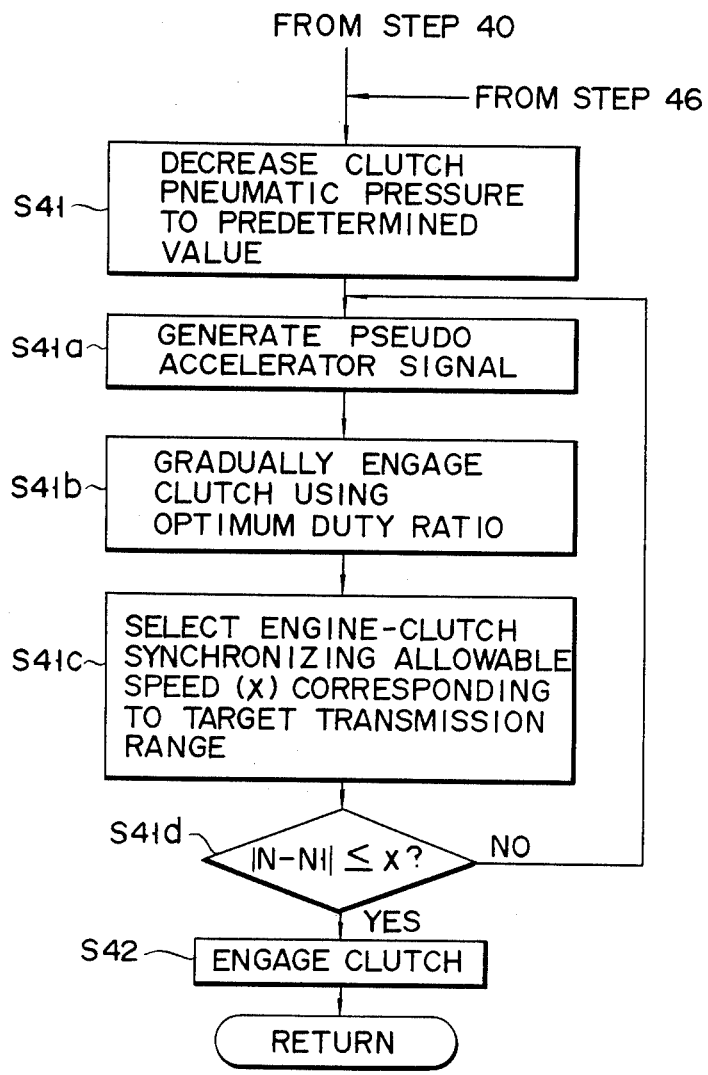
Figure 25:
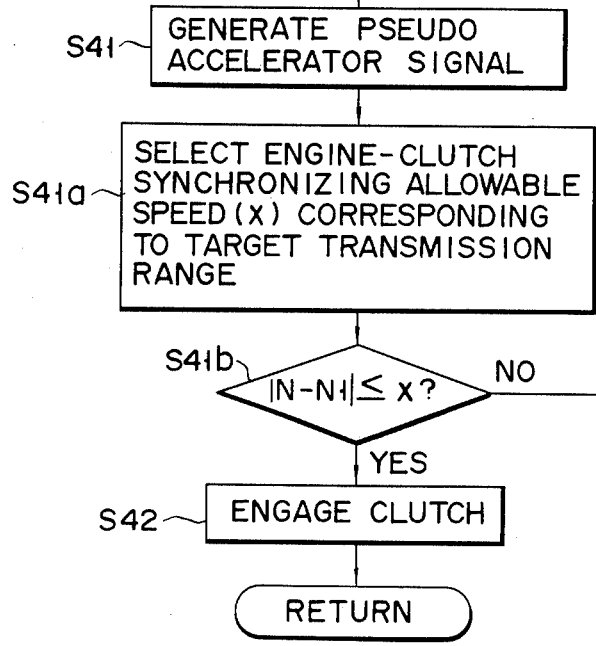
Figure 27:
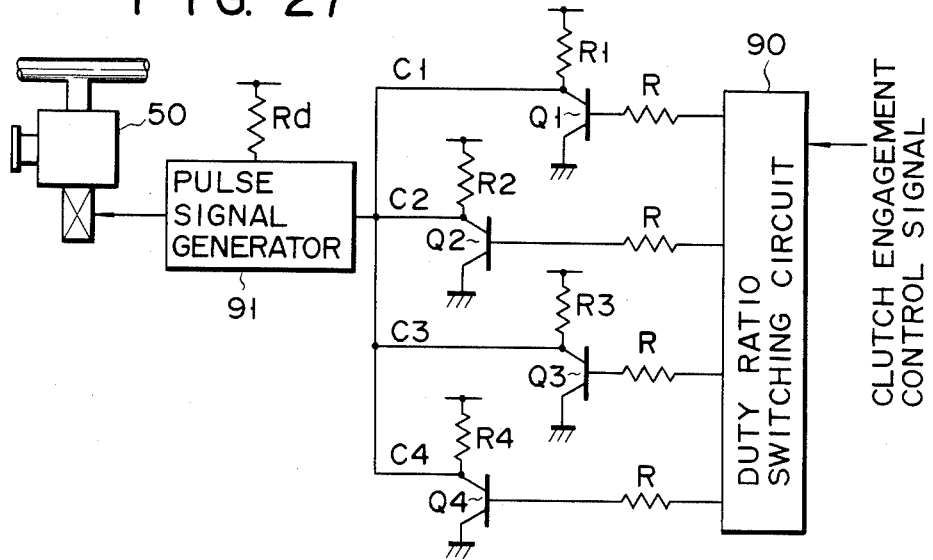
Figure 26:
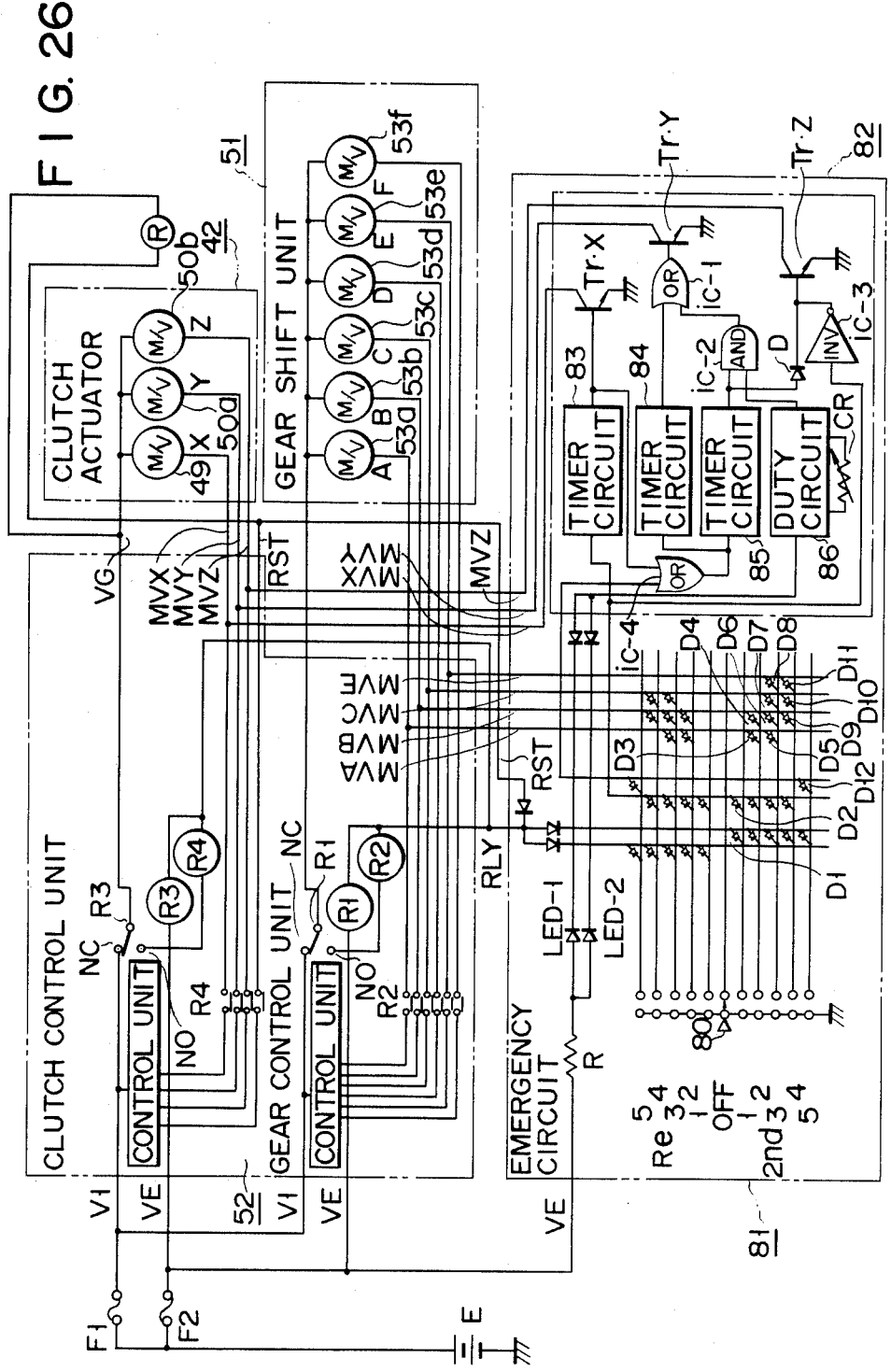

FIG. 16, consisting of FIGS. 16a and 16b, is a flow chart showing a second embodiment of the present invention;

FIG. 17 is a flow chart showing a third embodiment of the present invention;

FIG. 18 is a graph showing the relationship between a duty ratio $\alpha$ and a load signal of the third embodiment;

FIG. 19 is a graph showing a change in clutch pneumatic pressure, engine speed and speed of a clutch output shaft of the third embodiment with respect to time;

FIG. 20 is a flow chart showing a fourth embodiment of the present invention;

FIG. 21 is a flow chart showing a modification of the fourth embodiment;

FIG. 22 is a flow chart showing a fifth embodiment of the present invention;

FIG. 23 is a flow chart showing a sixth embodiment of the present invention;

FIG. 24 is a flow chart showing a seventh embodiment of the present invention;

FIG. 25 is a flow chart showing an eighth embodiment of the present invention;

FIG. 26 is a circuit diagram showing a ninth embodiment of the present invention; and FIG. 27 is a circuit diagram showing a tenth embodiment the present invention.

BEST MODE OF CARRYING OUT THE INVENTION

An embodiment of the present invention will be described with reference to the accompanying drawings.

In a first embodiment shown in FIGS. 1 to 16, FIG. 1 shows an automatic transmission apparatus which is mounted on a diesel engine (to be referred to as an engine hereinafter for brevity) 30, and a parallel-shaft automatic gear transmission 32 receiving a rotational force from the engine 30 through a clutch 31. The engine 30 comprises a fuel injection pump (to be referred to as a pump hereinafter for brevity) 34 having an input shaft 33 rotated at a speed half of the engine speed. A clutch 35 of the pump is coupled to a solenoid actuator 38. Note that the input shaft 33 has an engine speed sensor 39 for generating an engine speed signal. The clutch 31 normally presses a clutch disk 41 against a flywheel 40 by a known clamping means (not shown). When an air cylinder 42, as an actuator, is operative, the clamping means (not shown) is actuated in a release direction and the clutch 31 moves from an engagement direction a to a disengagement direction b (FIG. 1 shows a disengaged state). The clutch can be provided with a clutch engagement/disengagement sensor 43 for detecting an engagement/disengagement state thereof. An output shaft 44 of the clutch 31 is provided opposite to a clutch speed sensor 45 for generating a clutch speed signal. An air path 47 extends from an air chamber 46 of the air cylinder 42, and is coupled to an air tank 48 as a high-pressure air source. Midway along the air path 47, an intake solenoid valve 49 for connecting/disconnecting operation air, and an exhaust solenoid valve 50 for opening the air chamber 46 are provided. Note that an actuator control means is constituted by the intake and exhaust solenoid valves 49 and 50. Pneumatic pressure switches 70 and 72, constituting a clutch position detecting means for detecting an inner pneumatic pressure are mounted on the air cylinder 42 and the air tank 48, respectively. The pneumatic pressure switch 70 detects a pneumatic pressure equal to or higher than a predetermined value, and the switch 72 detects a pneumatic pressure lower than the predetermined value.

In order to change a gear position in the transmission 32, when a gear shift lever 54 is operated to a transmission position corresponding to the shift pattern shown in FIG. 2, a transmission range selection switch 55 is switched, a gear shift unit 51, as a transmission position switching means, is operated in accordance with a transmission signal obtained from the switch 55, and the gear position is changed to a target transmission range corresponding to the shift pattern. Note that reference symbol R denotes a reverse range, reference symbol and numerals N, 1, 2 and 3 denote the designation transmission range, and reference symbol D denotes a selective transmission range. When the range D is selected, second to fifth speeds are selected in accordance with a vehicle speed by an optimum transmission range detecting processing (to be described later). The gear shift unit 51 has a plurality of solenoid valves 53 (only one is shown) operated by a control signal from a conrol unit 52, and a power cylinder for operating a select fork or a shift fork (neither are shown) of the transmission by high-pressure operation air from the air tank 48. The unit 51 drives the power cylinder by the control signal supplied to the solenoid valves so that the meshing state of the transmission 32 is changed in the order of a select direction and a shift direction. Furthermore, the gear shift unit 51 is provided with a transmission position switch 56 constituting a transmission position detecting means for detecting the transmission position, and a gear position signal from this switch is supplied to the control unit 52. A sensor 58 for generating a vehicle speed signal is provided on an output shaft 57 of the transmission. An accelerator load sensor 60 is mounted on an accelerator pedal 37 so as to generate a change in resistance corresponding to a pivot amount of the pedal 37 as a voltage signal, and the voltage signal is converted into a digital signal by an A/D converter 59. A brake sensor 62 is mounted on a brake pedal 61 so as to generate a high-level brake signal when the pedal 61 is depressed. A starter 63, appropriately meshed with a ring gear provided on an outer periphery of the flywheel 40 for starting the engine 30, is provided adjacent to the flywheel 40, and a starter relay 64 of the starter 63 is connected to the control unit 52.

Note that reference numeral 65 denotes an engine controller mounted on a vehicle, in addition to the control unit 52, for performing various control operations of the vehicle. The controller 65 controls the engine 30 upon reception of input signals from sensors (not shown). The engine controller 65 supplies a control signal to the solenoid actuator 38 of the pump 34 so as to increase/decrease a fuel quantity, thereby controlling the engine speed. Note that the engine controller 65 can receive an output signal as an engine speed increase/decrease signal from the control unit 52 prior to other components, and can increase/decrease the engine speed in accordance with the output signal.

The control unit 52 comprises a microcomputer for the automatic transmission apparatus, and is constituted by a microprocessor (to be referred to as a CPU hereinafter) 66, a memory 67 and an interface 68 as an input signal processing circuit. An input port 69 of the interface 68 receives sensor output signals from the transmission range selection switch 55, the brake sensor 62, the accelerator load sensor 60, the engine speed sensor 39, the clutch speed sensor 45, the gear position switch 56, the vehicle speed sensor 58, the clutch engagement/disengagement sensor 43 and the pneumatic pressure sensors 70 and 72. An operating condition detecting means is constituted by the brake sensor 62, the accelerator load sensor 60, the engine speed sensor 39, the clutch speed sensor 45 and the vehicle speed sensor 58. An output port 74 is connected to the engine controller 65, the starter relay 64, the exhaust solenoid valve 50, the intake solenoid valve 49 and the solenoid valves 53, and can supply a control signal thereto. Note that reference numeral 75 denotes a warning lamp illuminated upon reception of an output through a driver circuit (not shown) when the pneumatic pressure in the air tank 48 does not reach a preset valve. Furthermore, reference numeral 76 denotes a clutch wear lamp illuminated upon reception of an output when a clutch wear amount exceeds a predetermined value.

The automatic transmission apparatus is provided with a brake failure sensor 77. The brake failure sensor 77 detects a brake device malfunction, and a sensor output signal therefrom is supplied to the input port 69 of the interface 68 in the same manner as the above-mentioned sensors. The memory 67 comprises a ROM (read-only memory) which stores the program shown in the flow charts of FIGS. 3 to 7 and data, and a read/write RAM. In addition to the program, the ROM stores, in advance, a duty ratio $\alpha$, corresponding to the accelerator load signal, as a data table (see FIG. 8), and is accessed to read out a desired value from the data table, as needed. Furthermore, the transmission range selection switch 55 generates select and shift signals as the transmission signal. The transmission position corresponding to the combination of the select and shift signals is stored in the ROM as a data table in advance. When the interface 68 receives the select and shift signals, it supplies a corresponding control signal by table look-up to the solenoid valves 53 of the gear shift unit 51 so as to adjust the gear position to the target transmission range corresponding to the transmission signal. The gear position signal from the gear position switch 56 is generated every time the transmission operation is completed, and is used for checking if all the gear position signals corresponding to the select and shift signals are generated, and for generating a meshing enable or disable signal.

Figure 9:
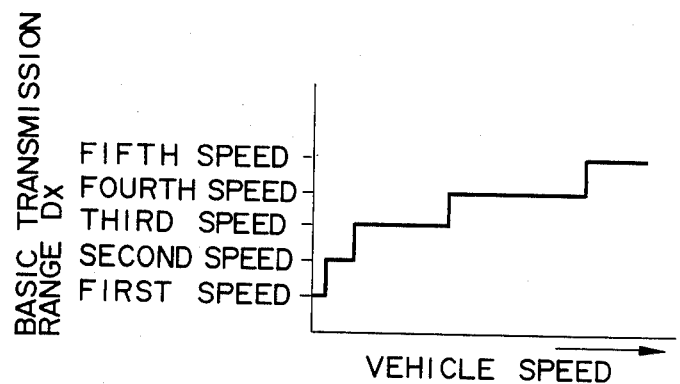
FIGS. 9 to 11 are data tables showing examples of relationships between which speed and standard transmission range, engine load and first correction value and, engine speed and second correction value used for calculating an optimum transmission range in a selective transmission range mode of the control program.
Figure 10:
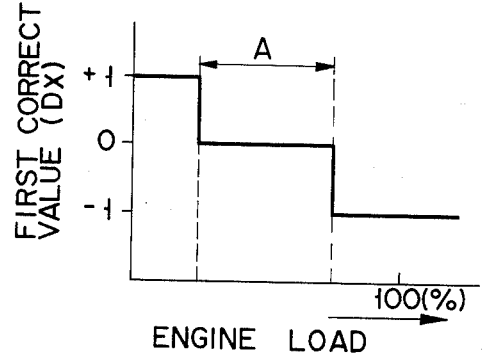
Figure 11:
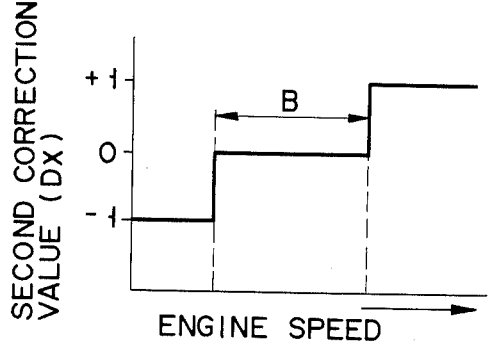

Furthermore, the ROM stores a data table for determining an optimum transmission range in accordance with the sensor signals from the accelerator load and engine speed sensors when the target transmission range is in the selective transmission range (D) mode. FIGS. 9, 10 and 11 show examples of these data tables. A basic transmission range Dx corresponding to a vehicle speed is read out from a first table and no correction is made when it is detected from a second table that an engine load is present in a steady area A; but a first correction value (Dx) corresponding to shift-down or shift-up by one range is fetched when the engine load is higher or lower than the steady area A. Then, in accordance with a third table access, no correction is made when the engine speed falls within a steady area B; but a second correction value [Dx] corresponding to shift-up or shift-down by one range is fetched when the engine speed is higher or lower than the steady area B. In the control operation of the (D) mode, the transmission range corresponding to the second correction value is determined as the optimum transmission range, and is regarded as the target transmission range.

FIG. 15 shows an output switching circuit of the accelerator load sensor 60 in the control unit 52. The accelerator load signal from the accelerator load sensor 60 is supplied to the engine controller 65 through a movable contact S of a switching relay R. The movable contact S of the switching relay R is switched in the direction indicated by arrow C when a coil L is energized. The coil L is energized when the intake solenoid valve 49 is turned on (opened) by a clutch engagement-/disengagement control circuit 78, that is, so as to correspond to disengagement control of the clutch 31. In the case of clutch disengagement control, a pseudo accelerator signal generating circuit 79 generates a pseudo accelerator signal for smoothly disengaging the clutch 31. In this case, the pseudo accelerator signal is supplied to the engine controller 65 through the switched movable contact S of the relay R. A diode D bypassing the relay R and enabled with respect to the engine controller 65 is inserted between an input line A of the engine controller 65 and an output line B of the pseudo accelerator signal generating circuit 79.

The automatic transmission apparatus comprises an emergency switch 80 and an emergency circuit 81 operated upon depression of the switch 80. The emergency switch 80 and the emergency circuit 81 are used in an emergency state when an abnormality occurs in the CPU 66 and control of the control unit 52 is disabled. The emergency switch 80 has a manual switching function so as to switch the transmission 32 to a predetermined gear position (in this case, "2" or "R"). In response to the manual switching operation of the switch 80, the emergency circuit 81 supplies a control signal to the solenoid valves 53 of the gear shaft unit 51, the intake solenoid valve 49 for driving the air cylinder 42, the exhaust solenoid valve 50 and the emergency exhaust solenoid valve 77.

The operation of the automatic transmission apparatus with the above arrangement will be described with reference to the flow charts shown in FIGS. 3 to 7.

Figure 3A:
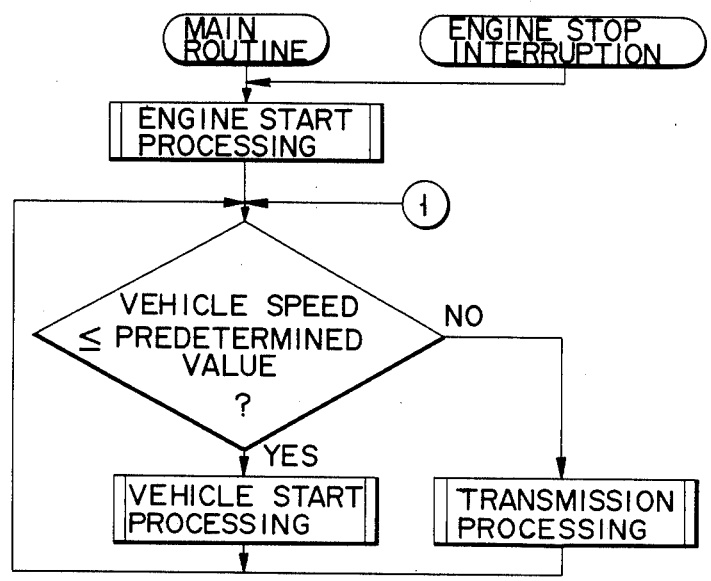
FIGS. 3a to 7 are flow charts showing a control program of the automatic transmission apparatus.
Figure 3B:
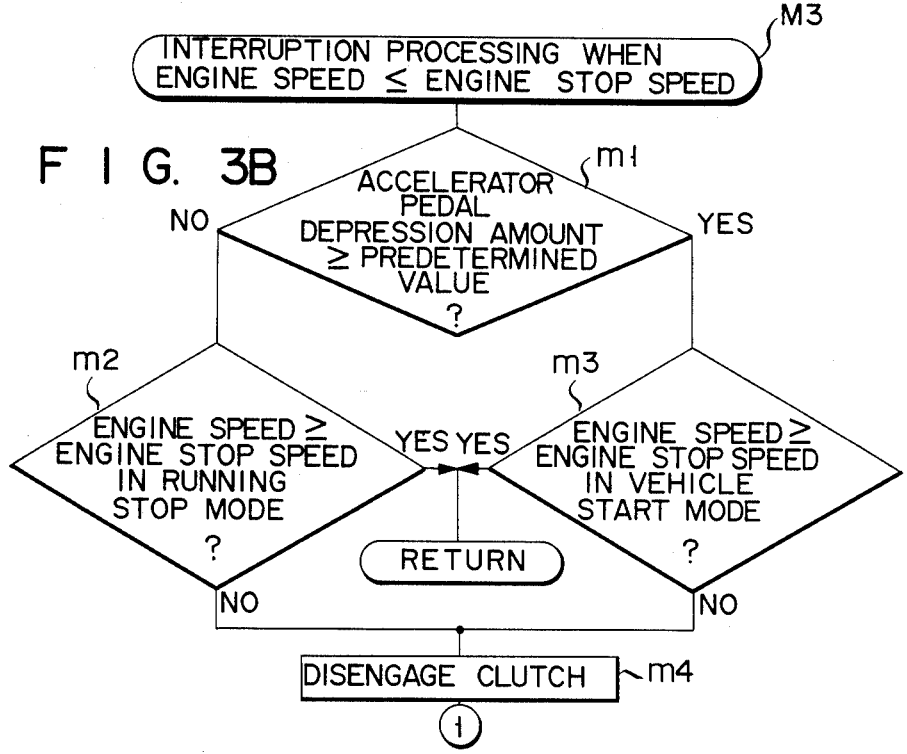

Referring to FIG. 3, when the program starts, the control unit 52 enters engine start processing as long as no engine stop interruption is present. After completing the engine start processing, the control unit 52 receives the vehicle speed signal from the vehicle speed sensor 58. When a vehicle speed is lower than a predetermined value (e.g., 2 km/h to 3 km/h), vehicle start processing is performed, otherwise, transmission processing is performed. However, when the engine speed signal from the engine speed sensor 39 is lower than a preset value as an engine stop speed and interruption conditions in an interruption routine are established, an ON signal is supplied to the cut valve 49, and an OFF signal is supplied to the pulse solenoid valve 50 so as to disengage the clutch 31 (step m4).

The interruption conditions correspond to steps m1 through m3. When an output from the load sensor 60, as an accelerator pedal depression amount, is higher than a predetermined value (step m1), i.e., when the CPU determines a vehicle start mode, it is checked in step m3 if the engine speed detected by the speed sensor 39 is higher than an engine stop speed V0 in the vehicle start mode. If NO in step m3, interruption processing is performed so as to prevent the engine from being stopped.

However, when the CPU determines that the accelerator pedal depression amount is not higher than the predetermined value (step m1), i.e., when the vehicle is going to stop from a normal running mode, it is checked in step m2 if the engine speed detected by the speed sensor 39 is higher than an engine stop speed V1 in a running end mode. If NO in step m2, the interruption processing is performed so as to prevent the engine from being stopped.

The engine stop speed V1 in the running end mode is set near an idling engine speed.

The engine stop speed V0 in the vehicle start mode is set to be lower than that in the running end mode.

Figure 13:
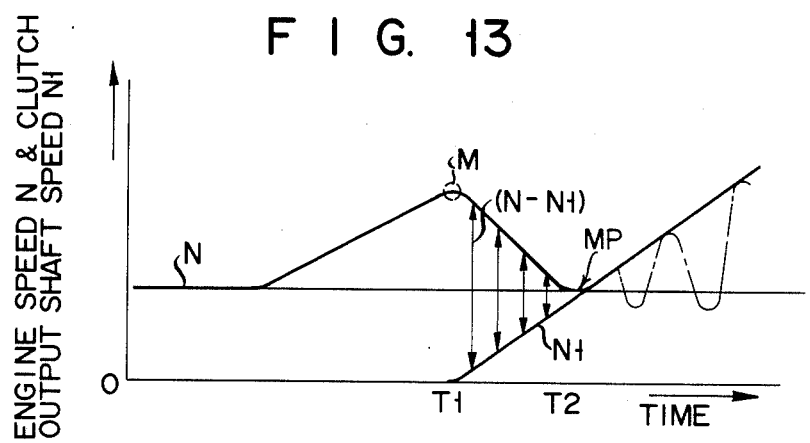
FIG. 13 is a graph showing changes, over time, in engine speed and speed of a clutch output shaft.
Figure 14:
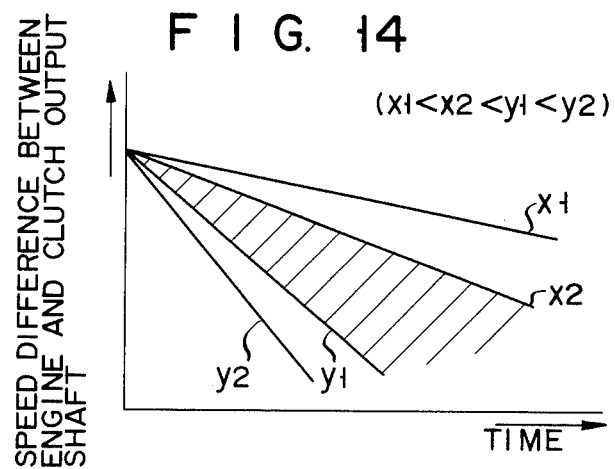
FIG. 14 is a graph showing a region in which a change, over time, in the difference between the engine speed and the speed of the clutch output shaft must be controlled.

Thus, as indicated by an alternate long and short dashed line in FIG. 13, even if the engine speed becomes lower than the idling engine speed in the vehicle start mode, a holding state of the clutch can be held and the vehicle can be smoothly started.

In the running end mode, even if the clutch is disengaged due to an engine speed lower than the engine stop speed, an engine brake is not operated, thereby avoiding discomfort to the driver.

Engine start processing will be described hereinafter with reference to FIG. 4. The engine speed signal is received from the engine speed sensor 39, and it is checked in step 1 if the value falls within an engine stop area (in the following drawings, step is represented as "S"). If YES in step 1, i.e., if the engine is stopped, it is checked in step 2 whether or not a position of the gear shift lever 54 coincides with a gear setting position, i.e., whether or not the transmission signal from the transmission range selection switch 55 coincides with the gear position signal from the gear position switch 56, and the gear position of the transmission 32 is adjusted to the target transmission range instructed by the transmission range selection switch 55 (note that in the range D, the second speed as a maximum transmission ratio is preset). If YES in step 2, a drive signal is supplied to the starter relay 64 through a driver circuit (not shown) so as to operate a starter switch (not shown) so that the starter 63 can be started (step 3a). When the engine is started while the target transmission range is set in the neutral range N (step 4), the starter relay 64 is turned off (step 3b). It is then checked if the detection signal from the pneumatic pressure switch 72 exceeds a preset value (step 5). If YES in step 5, the flow returns. If NO in step 5, pressure increase in the air tank 48 up to the rated value is awaited, and step 5 ends. On the other hand, even when the target transmission range is set to obtain a high transmission ratio, if the target transmission range coincides with the gear position of the transmission 32, the starter 63 can be started. In this case, the vehicle wheels are rotated by the starter. If NO in step 2, the presence/absence of the pneumatic pressure is checked in step 6. If NO in step 6, an illumination control signal is supplied to the warning lamp 75 (step 7). However, if YES in step 6, or if YES in step 6 is obtained by external air supply, an ON (open) control signal is supplied to the intake solenoid valve 49 and an ON (close) control signal is supplied to the exhaust solenoid valve 50 through the output port 74, respectively, so as to disengage the clutch 31 (step 8). During disengagement of the clutch 31, the gear shift unit 51 receives a transmission control signal, corresponding to the target transmission range, through the output port 74 of the control unit 52, and adjusts the gear position of the transmission 32 to the target transmission position (step 9). Thereafter, an OFF (open) control signal is continuously supplied to the exhaust solenoid valve 50 through the output port 74, that is, the air chamber 46 of the air cylinder 42 is opened for a predetermined period of time, thereby engaging the clutch (step 10). The control loop from step 2 to steps 6, 8, 9 and 10 is repeated until the gear position is adjusted to the target transmission range.

Figure 12:
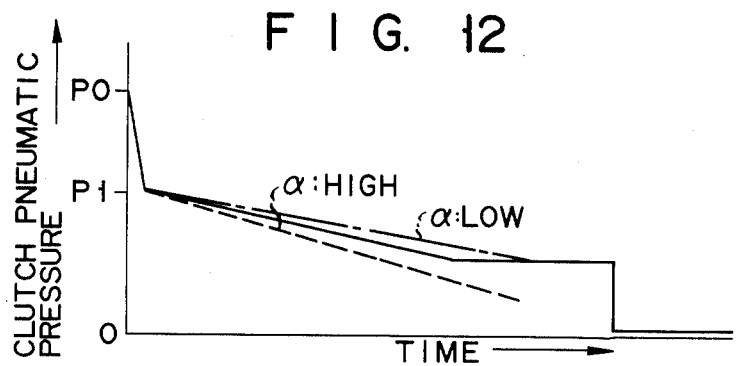
FIG. 12 is a graph showing a change in clutch pneumatic pressure over time.

Vehicle start processing will be described with reference to FIG. 5. After the engine start processing, the vehicle speed signal from the vehicle speed sensor 58 is fetched and, if the vehicle speed is lower than the preset value, the flow enters the vehicle start processing. The CPU 66 of the control unit 52 selectively fetches the clutch engagement/disengagement signal from the clutch engagement/disengagement sensor 43, or from the pneumatic pressure switch 70 through the input port 69. When the clutch engagement signal is received, i.e., if NO in step 11, the CPU 66 supplies the ON (open) control signal to the intake solenoid valve 49 so as to disengage the clutch 31, thereby disengaging the clutch 31, in step 12. If YES in step 11, it is checked in step 13 if the gear shift lever position coincides with the gear position in the same manner as in step 2. If NO in step 13, the gear position is adjusted to the target transmission range in step 14 in the same manner as in step 9. If YES in step 13, it is checked, with reference to the transmission signal from the transmission selection switch 55, whether or not the gear position corresponding to the target transmission range is in the neutral range N (step 15). If YES in step 15, the flow returns to step 11, otherwise, the flow advances to step 16. This step 16 corresponds to a discrimination function. It is checked in step 16 if the accelerator load signal corresponding to the accelerator pedal depression amount is higher than the predetermined value (a low value at which the driver intends to start the vehicle). If NO in step 16, steps 11, 13, 15 and 16 are repeated, otherwise, the pneumatic pressure of the clutch air cylinder 42, i.e., the pneumatic pressure corresponding to the output signal from the pneumatic pressure switch 70 is decreased from a tank pressure P0 to a predetermined value P1 (step 17). The load signal, as the accelerator pedal position is detected by the accelerator load sensor 60 (step 18), and a duty ratio α corresponding to the detected value are fetched using the data table shown in FIG. 8 (step 19). A pulse control signal of the obtained optimum duty ratio α is supplied from the control unit 52 to the exhaust solenoid valve 50. Thus, the clutch pneumatic pressure of the air chamber 46 is gradually decreased at a constant rate in accordance with time elapse, as shown in FIG. 12, and the clutch 31 is gradually half engaged from the disengaged state (step 20).

The CPU 66 supplies a selection signal to the input port 69 so as to continuously receive the engine speed signal from the engine speed sensor 39. The time-serial engine speeds, in accordance with the engine speed signal, are sequentially stored in the RAM in the memory 67, and their peak point M (an example is shown in FIG. 13) is calculated. Until the peak point M is detected, since NO in step 21, steps 18 through 21 are repeated. Then, if YES in step 21 is obtained, the flow advances to step 22. This step 21 corresponds to a third control function. Note that the peak point M is generated by a decrease in the engine speed since rotation of the engine 30 is transmitted as that of the clutch output shaft 44.

From a time T1 at which the peak point M is detected, the exhaust solenoid valve 50 is kept ON, i.e., closed. The CPU 66 supplies the selection signal to the input port 69 so as to input the clutch output shaft speed signal of the clutch output shaft 44 in addition to the engine speed signal from the engine speed sensor 39. A difference between the speeds of the engine 30 and the clutch 31 (indicated by N−N1 in FIG. 13) is calculated at predetermined intervals, and it is checked in step 22 if a change in speed difference N−N1 over time is equal to or lower than a first preset value x1 (see FIG. 14). If YES in step 22, the CPU 66 of the control unit 52 turns off, i.e., opens the exhaust solenoid valve 50 so as to release compressed air in the air chamber 46, thereby gradually engaging the clutch 31 (step 23). Thereafter, it is checked in step 24 if the change over time in speed difference N−N1 between the engine 30 and the clutch 31 is equal to or higher than a second preset value x2 (x1<x2). If NO in step 24, the flow returns to step 23, and the control loop for keeping the speed difference N−N1 between the engine 30 and the clutch output shaft 44 constant is repeated. On the other hand, if NO is step 22, it is checked whether or not the change over time in the speed difference N−N1 between the engine 30 and the clutch 31 is equal to or higher than a third preset value y2 (x2<y2) (step 25). These steps 22–24 correspond to a first control function. If YES in step 25, the ON (open) control signal is supplied to the intake solenoid valve 49 for an adequate period of time so as to properly return the clutch 31 in the disengagement direction a (step 26). It is checked in step 27 if the change over time in speed difference N−N1 between the engine 30 and the clutch 31 is equal to or lower than a fourth preset value y1. If NO in step 27, steps 26 and 27 are repeated, but if YES in step 27, the flow advances to step 28. These steps 25–27 correspond to a second control function. Note that if NO in step 25, the flow advances to step 28. At this time, in step 28, the change over time in speed difference N−N1 between the engine 30 and the clutch 31 falls between values x1 and y2 shown in FIG. 14, and the clutch 31 and the pneumatic pressure of the air cylinder 42 are held in the current state since conditions for switching the clutch 31 to the engaged state without accompanying discomfort and extra time are satisfied.

Thereafter, the CPU 66 of the control unit 52 checks, in step 29, whether or not the speed difference between the engine 30 and the clutch output shaft 44 is equal to or lower than the predetermined value (e.g., N−N1=10 rpm). While NO in step 29, steps 22 through 29 are repeated. This step 29 corresponds to a fourth control function. At a time T2, i.e., if YES in step 29, the flow advances to step 30. In this case, the exhaust solenoid valve 50 is fully opened under the control of the control unit 52, thereby engaging the clutch. Thereafter, i.e., after the air cylinder 42 is stopped, the CPU 66 calculates (speed difference between engine and clutch)/(engine speed) as a slip ratio of the clutch 31, and compares the calculated value with a predetermined value in step 31. If YES in step 31, the flow returns, and if NO in step 31, the flow advances to step 32. In step 32, the CPU 66 supplies an illumination control signal as a clutch wear warning signal to the clutch wear lamp 76 through the output port 74 and a driver circuit (not shown), from a determination that the clutch wear amount is large, thereby illuminating the lamp 76.

Transmission processing will be described with reference to FIGS. 6 and 7. After completing the engine start processing, the CPU 66 of the control unit 52 fetches the vehicle speed signal from the vehicle speed sensor 58 and, when the vehicle speed exceeds the preset value, the flow enters the transmission processing. The CPU supplies a designation signal to the input port 69, and checks, in step 33a, the presence/absence of a brake failure signal from the brake failure sensor 77. If NO in step 33a, the presence/absence of a brake signal from the brake sensor 62 is checked in step 33b. If YES in step 33b, the presence/absence of the clutch engagement signal from the clutch engagement/disengagement sensor 43 or the pneumatic pressure switch 70 is checked in step 34. Then, if YES in step 34, the flow returns.

In this manner, when the brake pedal is abruptly depressed and if the clutch is engaged, the transmission processing, to be described later, is temporarily interrupted. If NO in step 33b or 34, i.e., when the brake pedal is not operated or when the clutch is disengaged if the brake pedal is abruptly depressed, the flow advances to step 35. The transmission signal from the transmission range selection switch 55 is fetched, and is divided into three modes, i.e., the designation transmission range including ranges N, 1, 2 and 3, the selective transmission range D and the reverse range R. In the designation transmission range, it is checked in step 36 if the setting position of the gear shift lever 54 coincides with the gear position of the transmission 32. If YES in step 36, the flow returns, or otherwise, advances to step 37. In this case, since the target transmission range corresponding to the transmission signal from the transmission range selection switch 55 is one of the ranges N, 1, 2 and 3, and the current transmission range before the transmission operation is the selective transmission range (D), it is checked in step 36 if the gear position is shifted down from the selective transmission range (D). If YES in step 36, the ON (open) control signal is supplied to the intake solenoid valve 49 through the output port 74 of the control unit 52 for a predetermined period of time, thereby disengaging the clutch (step 38).

Simultaneously, in order to maintain the current engine speed, the switching relay R of the control unit 52 shown in FIG. 12 is switched by energization of the coil L, and the pseudo accelerator signal is supplied to the engine controller 65 through the output port 74, thereby operating the solenoid actuator 38. Thus, an overrun state of the engine can be prevented (step 39). In this case, since the diode D, directed forward with respect to the engine controller 65, is inserted between the output line B of the pseudo accelerator signal and the input line A of the engine controller 65, the pseudo accelerator signal is supplied when the movable contact S of the switching relay R is switched from the accelerator load sensor 60 side. Therefore, since the input line A of the engine controller 65 does not exhibit a high impedance (high resistance) state due to a switching time lag of the movable contact S, as indicated by arrow C, the engine controller 65 cannot malfunction or overrun. The transmission range corresponding to shift-down by one range from the immediately preceding transmission range is calculated, and the transmission control signal corresponding to the calculated transmission range is supplied to the solenoid valves 53 of the gear shift unit 51, thus switching the gear position of the transmission 32 (step 40). Thereafter, the speed signals from the engine 30 and the clutch output shaft 44 are fetched from the engine speed sensor 39 and the clutch speed sensor 58. In addition, the pseudo accelerator signal is supplied from the output port 74 of the control unit 52 to the engine controller 65 and the control signal is supplied as the engine speed increase/decrease signal to the solenoid actuator 38 so as to cause the rotational speed of the clutch output shaft 44 to coincide with the engine speed, thereby adjusting the engine speed (step 41).

Thereafter, the control unit 52 supplies the ON (open) control signal to the exhaust solenoid valve 50 for a predetermined period of time, thereby engaging the clutch (step 42). These steps 41 and 42 form a coincidence control means. The control loop, consisting of steps 33 and 35 to 42, is circulated once every shift-down processing by one range, and the flow enters the loop which directly returns from step 36 when the gear position is finally adjusted to the target transmission range. On the other hand, if NO in step 37, the same clutch disengaging operation as in step 38 is performed (step 43). Then, the CPU 66 compares the current transmission range before the transmission operation with the target transmission range corresponding to the transmission signal from the transmission range select switch 55, thus checking if the gear position is to be shifted up (step 44). If YES in step 44, the pseudo accelerator signal is supplied from the output port 74 of the control unit 52 to the engine controller 65, thereby controlling the solenoid actuator 38 so as to return the engine speed to the predetermined idling speed (step 45). The control unit 52 supplies the transmission control signal to the solenoid valves 53 of the gear shift unit 51 so as to directly adjust the gear position of the transmission 32 to the target transmission range as one of the ranges N, 1, 2 and 3 (step 46). Thereafter, the flow returns to step 41, and the engine speed of the engine 30 is adjusted to the rotational speed of the clutch output shaft 44, thereby engaging the clutch. Note that if NO in step 44, i.e., when shift-down is performed from a range other than D, the engine speed is held in the same manner as in step 39 (step 47), and the flow then returns to step 46.

In step 35, in the case of the selective transmission range (D) mode, the CPU 66 receives the vehicle speed signal, the load signal and the engine speed signal, respectively, from the vehicle speed sensor 58, the accelerator load sensor 60 and the engine speed sensor 39 through the input port 69 (steps 48, 49 and 50) so as to calculate the basic transmission range Dx from the vehicle signal (see FIG. 9), the first correction value (Dx) from the accelerator load signal (see FIG. 10) and the second correction value [Dx] from the engine speed signal (see FIG. 11). Thus, the optimum transmission range, regarded as the target transmission range in this mode, is determined (step 51). Thereafter, it is checked in step 52 if the gear position of the transmission 32 coincides with the optimum transmission range, in the same manner as in step 2. If YES in step 52, the flow returns. If NO in step 52, the flow jumps to step 43 and steps 43, 44, 45, (47), 46, 41 and 42 are executed so as to adjust the gear position to the target transmission range during the clutch disengaging operation. Then, the flow returns.

Figure 7:
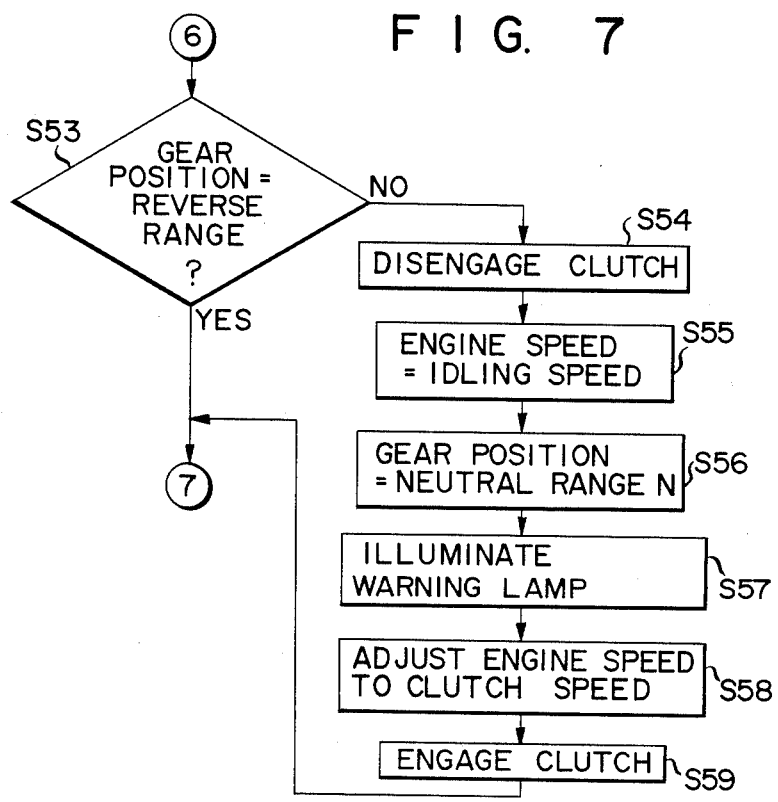
Figure 8:
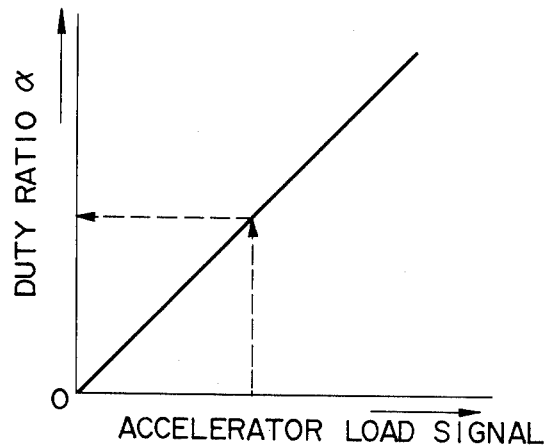
FIG. 8 is a graph showing a data table of (an accelerator load signal)/(duty ratio corresponding to time) used for executing the control program.

When the reverse range (R) mode is detected in step 35, the CPU 66 checks if the gear position of the transmission 32 coincides with the reverse range (R) as the target transmission range in the same manner as in step 2, as shown in FIG. 7 (step 53). If YES in step 53, i.e., when the vehicle is being moved backward, the flow returns. However, if NO in step 53, i.e., when a malfunction occurs, the clutch is disengaged in the same manner as in step 38 (step 54), and the control unit 52 controls the solenoid actuator 38 through the engine controller 65 so as to return the engine speed to the idling speed in the same manner as in step 45. Furthermore, the solenoid valves 53 of the gear shift unit 51 are controlled so as to return the gear position of the transmission 32 to the neutral range (N) (step 56), and a warning lamp (not shown) signalling an erroneous transmission operation (step 57) is illuminated. Thereafter, the speed of the clutch 31 and the engine speed of the engine 30 are controlled to coincide with each other so as to engage the clutch in the same manner as in steps 41 and 42 (steps 58 and 59). In this flow, when the reverse range is selected as the target transmission range during forward running, an erroneous transmission operation is signalled, and the gear position is returned to the neutral position (N).

Figure 6:
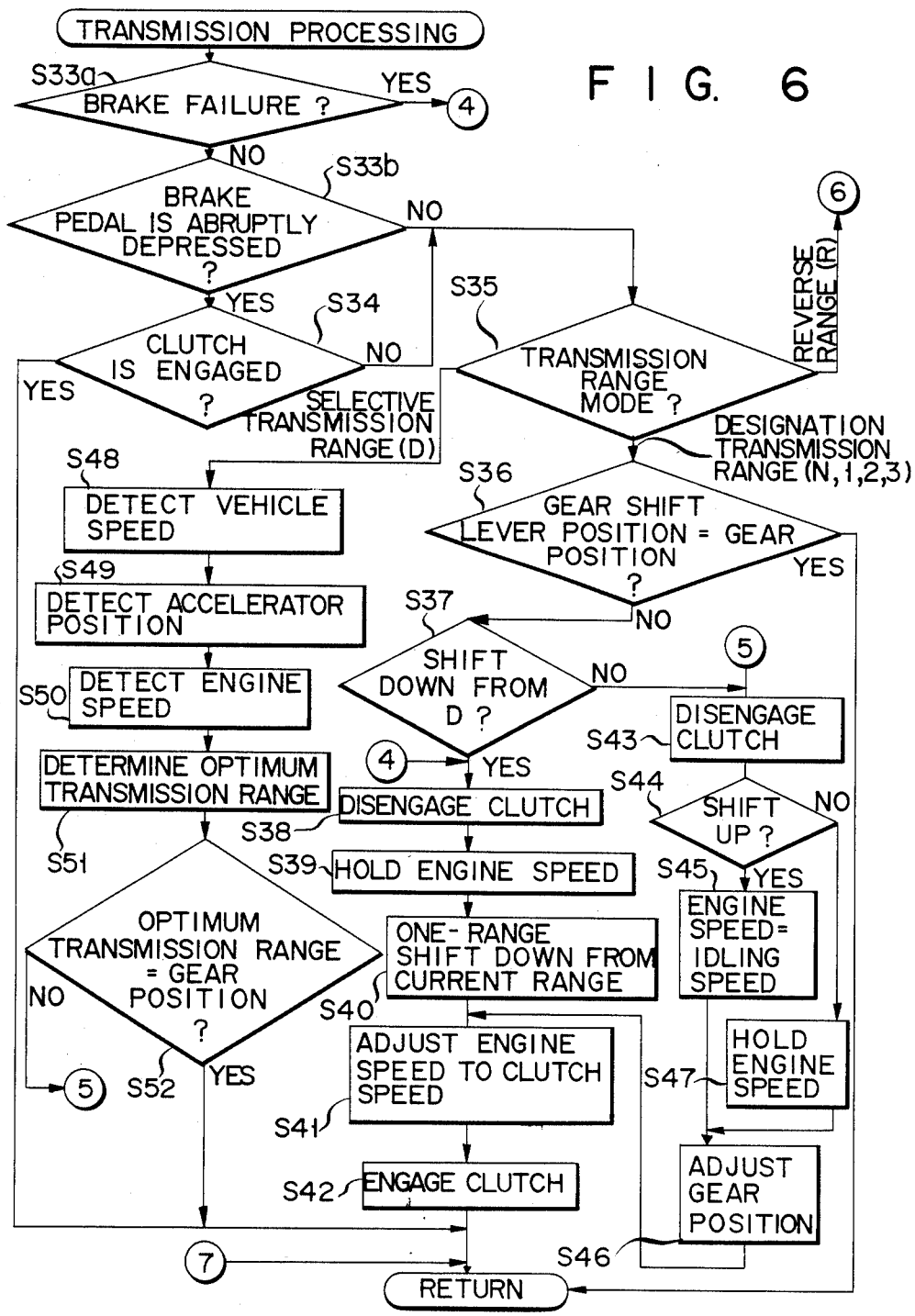

If YES in step 33a of FIG. 6, i.e., when a failure in the brake system is detected by the brake failure sensor 77, the flow jumps to step 38, and the same shift down control as described above is performed until step 42. In this case, the control loop consisting of steps 33a and 38 to 42 is repeated every shift down processing for one range until the gear position is finally adjusted to a predetermined transmission range for brake failure, e.g., the first speed (1st).

When, for example, the CPU 66 malfunctions and various control functions by the control unit 52 are disabled, the driver manually operates the emergency switch 80 in a direction of 2nd (second speed) or R (reverse), one by one. The control operation of the emergency circuit 81 will be described when the emergency switch 80 is operated in the direction of 2nd. When the switch 80 is set at the 1st range, the emergency circuit 81 supplies the ON (open) control signal to the intake solenoid valve 49, thereby disengaging the clutch 31. When the switch 80 is switched from the 2nd range to the 4th range, the emergency circuit 81 controls the solenoid valves 53 of the gear shift unit 51 so as to correspond to the switched ranges. In the 2nd range, the shift direction of the shift pattern shown in FIG. 2 is neutral-controlled to adjust the gear position of the transmission 32 to the neutral range (N). In the 3rd range, the select direction of the shift pattern is neutral-controlled so as to align the gear position along a 2nd-3rd line. In the 4th range, the shift direction is controlled in a direction of the 2nd range so as to change the gear position to the second speed. Thereafter, when the switch 80 is switched to the 5th range, the emergency switch 81 supplies the OFF (close) control signal to the intake solenoid valve 49, and simultaneously supplies a pulse (open) control signal of, e.g., the duty ratio $\alpha=20\%$ to the exhaust solenoid valve 50 through a timer circuit 82 for a predetermined period of time T. Compressed air in the air chamber 46 of the air cylinder 42 is gradually released through the exhaust solenoid valve 50, and the clutch 31 is engaged through the half-engaged state. At this time, the pulse control signal from the emergency circuit 81 is stopped, and the exhaust solenoid valve 50 is fully opened.

When the emergency switch 80 is operated in the direction of R, the gear position of the transmission 32 is changed to the range R under the same control as in second speed transmission control.

Thus, when the control unit 52 malfunctions, emergency running can be made by means of the predetermined transmission range, i.e., the second speed or R.

Note that in the above embodiment, the shaft pattern has five ranges R, 1, 2, 3 and D, but the present invention is not limited to this. For example, a second selective transmission range D2 can be provided. In this case, the mode discrimination operation in step 35 is replaced with a 4-mode discrimination operation, and the same operation of the 1st speed, as in steps 48 through 52, can be performed when the 4th mode is selected.

The predetermined transmission range of the emergency switch 80 is not limited to the second speed or R.

Figure 5A:
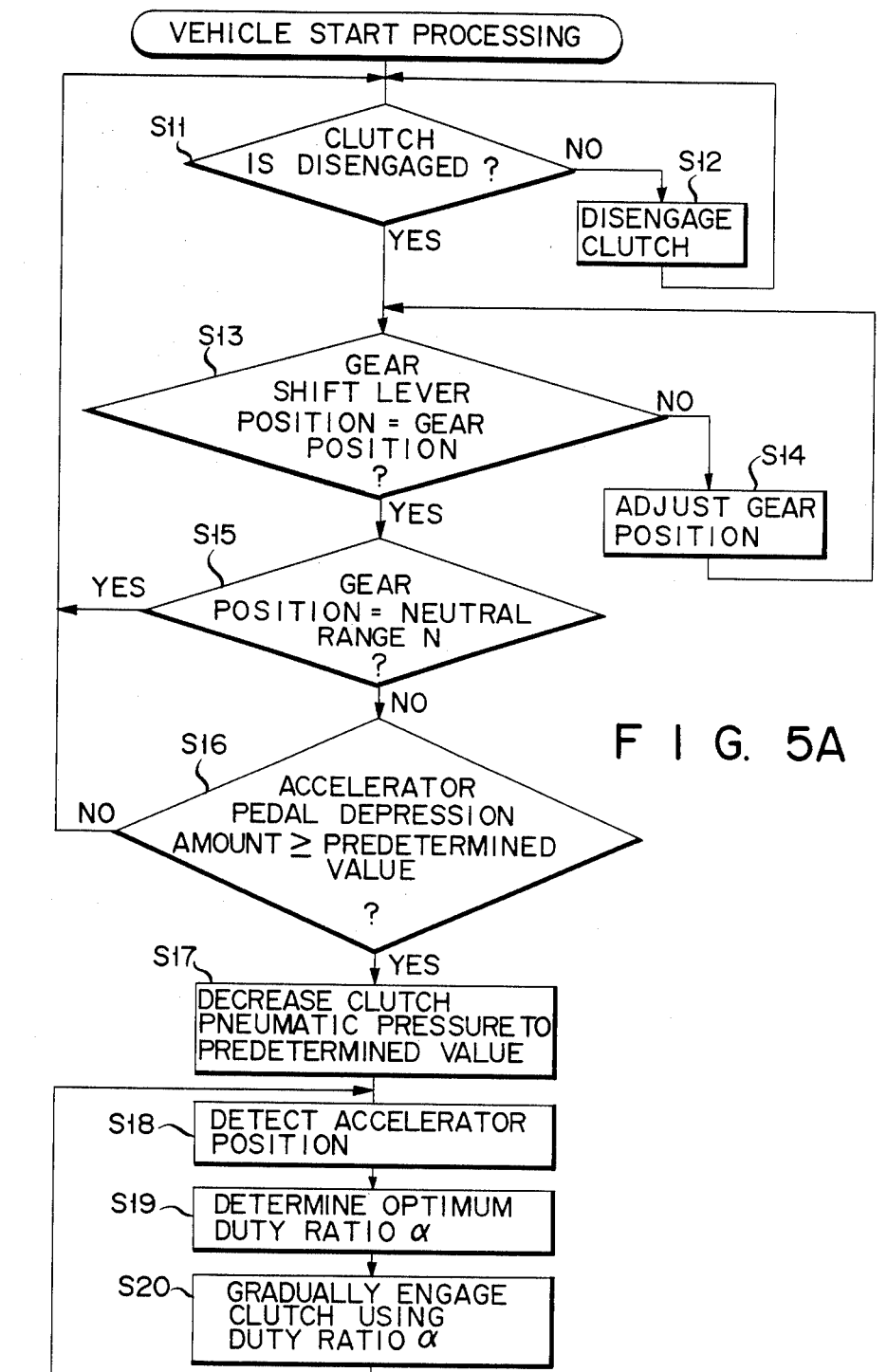
Figure 5B:
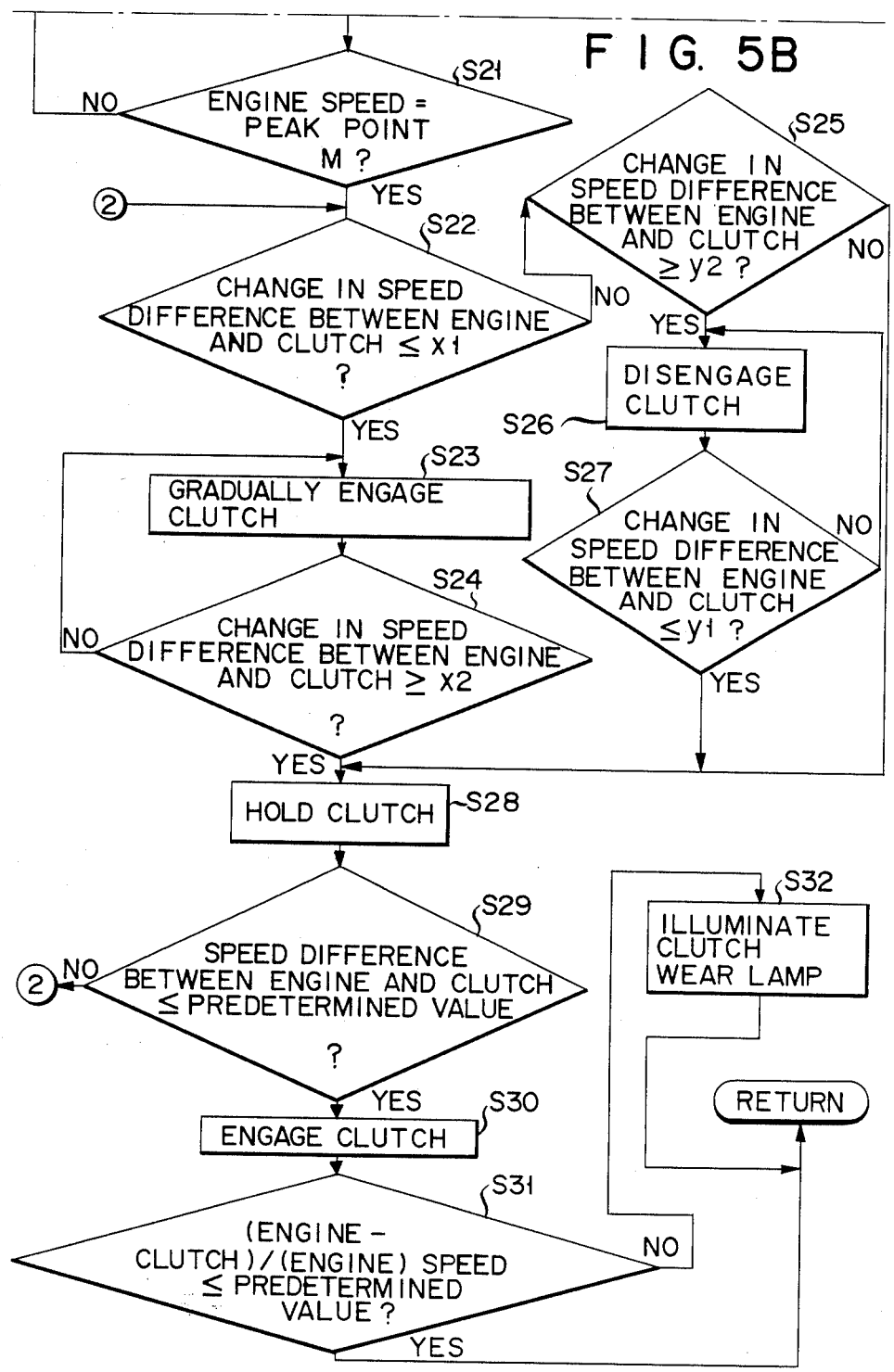

In the vehicle start processing of FIG. 5 of the first embodiment, the pressure in the air chamber 46 of the air cylinder 42 is controlled using the output signal from the pneumatic pressure switch 70 so as to move the clutch disk 41 in the direction a (engaging direction) by a predetermined distance. However, a stroke sensor can be used instead of the pneumatic pressure switch 70 so as to detect a stroke of the air cylinder 42 or the clutch disk 41, and the control unit 52 can control the stroke to a predetermined value.

In a second embodiment shown in FIG. 16, the flow of step 21 to return to the vehicle start processing shown in FIG. 5 according to the first embodiment is altered, and a changing rate of the engine speed is used instead of the changing rate of the difference between the engine speed and the clutch speed as in steps 22, 24, 25, 26 and 27 in the first embodiment. Furthermore, step 23, for gradually engaging the clutch, is constituted by step 23a for detecting an accelerator pedal position, step 23b for redetermining an optimum duty ratio $\alpha$ from the detected accelerator pedal position, and step 23c for controlling the exhaust solenoid valve 50 by the optimum duty ratio $\alpha$ so as to gradually engage the clutch. Note that x1, x2, y1 and y2 in steps 22 to 27 can be changed by replacing the abscissa representing the speed difference between the engine and the clutch output shaft of FIG. 14 of the first embodiment with that representing the engine speed. In step 31 of the first embodiment, it is checked if (the speed difference between the engine speed and the clutch)/(engine speed) is equal to or lower than the predetermined value. However, it can be checked if (clutch rotational speed)/(engine speed) is equal to or lower than the predetermined value.

Therefore, when the clutch is engaged in the vehicle start processing, if a decrease in engine speed over time is equal to or higher than the preset value, the clutch is gradually operated in the disengaging direction in accordance with a time ratio corresponding to the duty ratio of the pulse signal. Therefore, even when a high load is applied to the vehicle, the engine is not stopped, and the vehicle can be smoothly started.

In a third embodiment shown in FIGS. 17 to 19, the flow of step 28 to return in the vehicle start processing of FIG. 5 in the first embodiment is altered, and step SS1 is provided next to step 28 for holding the clutch. That is, it is checked in step SS1 if an engine speed N is increased. If NO in step SS1, the engine speed N and a rotational speed N1 of the clutch output shaft approach each other and reach a meet point MP, as shown in FIG. 13.

The CPU 66 checks if the speed difference between the engine and the clutch output shaft is equal to or lower than the predetermined value (e.g., $N-N1=10$ rpm) so as to determine if the speeds reach the meet point MP. While NO in step S29, the loop of steps S22 to S29 is repeated. When they reach the meet point MP at a time T2, i.e., if YES in step S29, the flow advances to step S30.

In this case, the pulse solenoid valve 50 is fully opened so as to engage the clutch.

As shown in FIG. 19, in the half-engaged state of the clutch, when the engine speed N is increased, i.e., when the driver depresses the accelerator pedal even though the engine speed N and the clutch output shaft rotational speed N1 approach the meet point MP, the control unit 52, as a means for returning a clutch to a half-engaged state, determines YES in step SS1, and steps SS2, SS3, SS4 and SS5 are executed.

In this case, the accelerator pedal position, as a load signal, is detected in step SS2, and an optimum altered duty ratio $\beta$ is determined in step SS3.

The altered duty ratio $\beta$ has substantially the same meaning and is determined by fetching from a data table shown in FIG. 18 so as to correspond to a load signal.

As shown in FIG. 18, the altered duty ratio $\beta$ is fetched from characteristics shifting the duty ratio $\alpha$ so as to be similar than the duty ratio $\alpha$, so that no shock is applied to the vehicle due to air exhaustion in accordance with the altered duty ratio $\beta$.

A pulse signal corresponding to the obtained optimum altered duty ratio $\beta$ is supplied to the pulse solenoid valve 50, and a pneumatic pressure in the air chamber 46 is gradually and constantly decreased in accordance with time elapse, as indicated by a solid line during time T3 to T5 in FIG. 19, and the clutch approaches the engaged state.

Air exhaustion of the air chamber 46 in accordance with the altered duty ratio $\beta$ in steps SS2 to SS5 is repeated.

Thus, an increaasing rate of the engne speed N is gradually decreased, and finally, the engine speed N reaches a peak point M' upon which the speed N begins to increase.

When the engine speed N exceeds the peak point M', steps S22 to S39 are repeated and substantially the same half-engaged state of the clutch as that before the time T3 when the accelerator pedal 37 is depressed, at which the speed difference between the engine and the clutch output shaft is equal to or lower than the predetermined value, can be achieved, as indicated by a solid line corresponding to time T5 and thereafter in FIG. 19.

Thereafter, the engine speed N and the clutch output shaft rotational speed N1 approach each other, and reach a meet point MP'. Thus, it is determined in step S29 that the speed difference between the engine and the clutch is equal to or lower than the predetermined value, and the clutch is engaged in step S30.

Note that during the altered duty ratio air exhaustion period, when the accelerator pedal 37 is depressed, steps SS2 to SS5, for air exhaustion (to the atmosphere) in accordance with the altered duty ratio, are executed.

Thereafter, when the air cylinder 42 is rendered inoperative, the CPU 66 calculates (the speed difference between the engine and the clutch)/(engine speed) as a slip ratio of the clutch, and the calculated value is compared with the predetermined value. When the calculated value is equal to or lower than the predetermined value, the flow returns, or otherwise advances to step S32 (step S31). In step S32, since it is determined that the clutch wear amount is large, an ON signal, as a clutch wear signal, is supplied to a clutch wear lamp 76 through the output port 74 and a driver circuit (not shown), thus illuminating the lamp 76. With the simple structure in which the engine stop speed in the vehicle start mode is set to be smaller than that in the vehicle stop mode, the operation of the clutch and the transmission can be automatically and satisfactorily performed.

Particularly in the vehicle start mode and the vehicle stop mode, a shock due to disengagement of the clutch for preventing the engine from stopping, can be avoided.

A fourth embodiment shown in FIG. 20 is a modification of step 31 of FIG. 16 according to the second embodiment. As shown in FIG. 20, after engaging the clutch in step 30, i.e., after the air cylinder 42 is rendered inoperative, it is checked, in step 31a, if the engine speed N has reached a preset idling engine speed Ni. If NO in step 31a, step 31a is repeated. If YES in step 31a, i.e., when it is determined that the engine speed N exceeds the idling engine speed Ni and falls within a stable rotating region the flow advances to step 31b so as to calculate a ratio of (the clutch rotational speed)/(the engine speed) for the engine speed N and the clutch rotational speed N1, and the calculated value is compared with the predetermined value. When the calculated value is smaller than the predetermined value, the flow returns, or otherwise, the flow advances to step 32. Therefore, since it is discriminated if the clutch slip ratio is equal to or higher than the predetermined value when the engine speed has fallen within the stable rotating region equal to or higher than the predetermined value after engaging the clutch, the clutch wear lamp can be reliabily illuminated without calculating an erroneous clutch slip ratio.

Note that in the above embodiment, it is checked in step 31a, immediately after the engine speed N has reached the stable region, if the slip ratio is equal to or higher than the predetermined value. However, as shown in FIG. 21, the slip ratio is calculated n times in step 31b, and it is then checked if the average value thereof is equal to or higher than the predetermined value so as to illuminate the clutch wear lamp 76.

Through it is not shown in FIG. 21, when the slip ratio is calculated $2n+1$ times, i.e., an odd number of times in a step corresponding to step 31b and, thereafter, if it is determined, in a step corresponding to step 31c, that the number of times $\alpha$ at which the slip ratio is equal to or higher than the predetermined value is larger than the number of times $\beta$ at which the slip ratio is lower than the predetermined value, the clutch wear lamp 76 can be illuminated.

In this manner, when the flow charts are executed, reliability for illuminating the clutch wear lamp 76 can be further improved.

Figure 4:
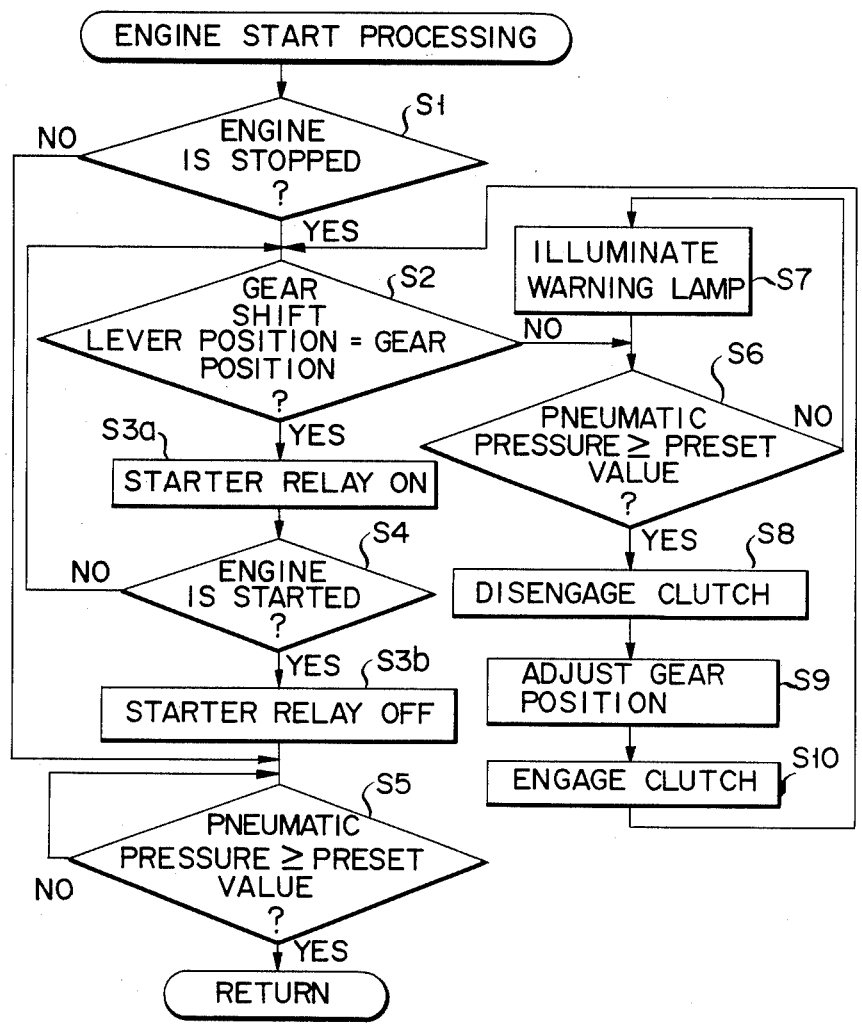

In a fifth embodiment shown in FIG. 22, steps S1a, S1b and S1c are added between steps 1 and 2 in the engine start processing shown in FIG. 4 and according to the first embodiment.

The CPU 66 receives the engine speed signal from the engine speed sensor 39, and checks in step 1 if the engine speed falls within an engine stop region (note that step is indicated by S in the following figures). When the engine is stopped, YES is obtained in step 1.

In this case, the control unit 52 supplies the OFF (close) control signal to the intake solenoid valve 49, and the OFF (open) control signal to the exhaust solenoid valve 50 so as to fully engage the clutch 31. In addition, a pneumatic pressure in the air cylinder 42 when the clutch 31 is fully engaged is fetched by the pneumatic pressure switch 70 (step 1a). In step 1b, a time $\Delta t$ (e.g., 0.5 sec) is counted and, during this time, LE point correction processing in step 1c is performed. Note that an LE point represents a position of the clutch disk 41 shifted from the fully engaged position thereof, with the flywheel 40 in a direction indicated by arrow b by $\Delta l$ (not shown), i.e., immediately after or before the half-engaged state of the clutch. The control unit 52 calculates, in accordance with a pneumatic pressure in the air cylinder 42 when the clutch disk 41 reaches the fully engaged state and the predetermined shift amount $\Delta l$, a prospective pneumatic pressure P1 in the air cylinder 42 corresponding to the state wherein the clutch disk 41 is set at the LE point, and stores the calculated value. Then, the flow advances to step 2.

Therefore, every time the engine is started, a position (LE point) immediately before the half-engaged state of the clutch and corresponding to the wear amount of the clutch disk 41 can be detected and stored. Thus, the clutch 31 can be precisely moved from the disengaged state to the half-engaged state and a smooth clutch engagement/disengagement operation can be achieved.

A sixth embodiment shown in FIG. 23 is a modification of steps 11 to 16 of the vehicle start processing shown in FIG. 5 according to the first embodiment.

Referring to FIG. 23, when the vehicle speed is below the preset value and the engine is being operated, the vehicle start processing is performed. If the clutch 31 is OFF in step 11, it is checked, in step 13, if the gear shift lever position coincides with the gear position. If YES in step 13, the flow advances to step 15 so as to check, in accordance with the transmission signal from the transmission range select switch 55, whether or not the gear position reaching the target transmission range is in the neutral range N. If YES in step 15, the flow advances to step 15a and the control unit 52 supplies the OFF (close) control signal to the intake solenoid valve 49 and the OFF (open) control signal to the exhaust solenoid valve 50, thereby fully engaging the clutch 31. Simultaneously, the pneumatic pressure in the air cylinder 42 is, at this time, fetched from the pneumatic pressure switch 70. Then, the flow advances to step 15b, and the same LE point correction processing as that in step 1c of the fifth embodiment is performed. Then, the flow returns to step 13.

However, if NO in step 15, i.e., if the gear position is not in the neutral range N position, but in the running position, the flow advances to step 16 (step 15). This step 15 corresponds to a first enable function. It is checked in step 16 if the accelerator load signal, as the accelerator pedal depression amount, is equal to or higher than the predetermined value (a low value indicating that the driver intends to start the vehicle). If NO in step 16, steps 11, 13, 15 and 16 are repeated, or otherwise the pneumatic pressure in the air cylinder 42, detected by the pneumatic pressure switch 70, is decreased from the tank pressure P0 in the air tank 48 to the pneumatic pressure P1 corresponding to the LE point of the clutch 31, which is calculated and stored in step 15b in advance (step 17). The clutch disk 41 moves from the fully disengaged state in a direction indicated by arrow a, and is located at a position distant by Δl from the fully engaged position with the flywheel 40, i.e., immediately before the half-engaged state. In this case, since the LE point, with reference to the engaged position of the clutch 31, is detected and stored in advance in step 15b, even when the clutch disk 41 is, for example, worn and the fully engaged position is changed, the moving distance to the LE point can always be detected, thus allowing an optimum half-engaged state.

A seventh embodiment shown in FIG. 24 is a modification of steps 41 and 42 of the transmission processing shown in FIG. 6 according to the first embodiment. When step 40 or 46 ends, the clutch pneumatic pressure is decreased to the predetermined value P1 in step 41 in the same manner as in step 17 of FIG. 5 of the first embodiment, and the clutch 31 is set in the state immediately before the half-engaged state (step 41). The speed signals from the engine 30 and the clutch output shaft 44 are derived from the engine speed sensor 39 and the clutch speed sensor 58. In order to adjust the engine speed to the rotational speed of the clutch output shaft 44, the pseudo accelerator signal is supplied from the output port 74 of the control unit 52 to the engine controller 65 and the control signal as the engine speed increase/decrease signal is supplied to the solenoid actuator 38 so as to adjust the rotational speeds (step 41a). Furthermore, in addition to such engine speed control, the exhaust solenoid valve 50 is open/close controlled in accordance with the pulse control signal of the optimum duty ratio $a$, thereby gradually moving the clutch 31 from the disengaged state to the half-engaged state (step 41b). In this manner, very effective engine-clutch speed adjust control can be performed. The control unit 52 selects an engine-clutch synchronizing allowable speed x corresponding to the target transmission range (in this case, the transmission range shifting down in step 40) (step 41c).

The CPU 66 receives the detection signals of the engine speed N and the clutch speed N1 from the engine speed sensor 39 and the clutch speed sensor 45, and checks whether or not the speed difference $|N-N1|$ therebetween is equal to or lower than the synchronizing allowable speed x (step 41d). If NO in step 41d, the flow returns to step 41a, and the engine-clutch speed adjust control is repeated by means of the engine speed control and duty control of the exhaust solenoid valve 50. Meanwhile, if YES in step 41d, i.e., when the speed difference $|N-N1|$ between the engine and the clutch has reached the synchronizing allowable speed x or lower, and an uncomfortable shock due to clutch engagement can be avoided, the control unit 52 supplies the ON (open) control signal to the exhaust solenoid valve 50 for a predetermined period of time, thereby engaging the clutch (step 42).

When the shift up or down operation is performed in the designation transmission ranges (N, 1, 2, 3), and the transmission operation is performed in the selective transmission range (D), the exhaust solenoid valve 50 is open/close controlled in accordance with the pulse signal of the optimum duty ratio $a$ together with the engine speed control by the pseudo accelerator signal, thereby performing the speed adjust control between the engine and the clutch. Therefore, it takes only a very short period of time for the speed difference between the engine speed N and the clutch rotational speed N1 to reach the synchronizing allowable speed x or lower. Thus, a rapid, shockfree clutch engagement/disengagement operation can be achieved, resulting in a short transmission time.

An eighth embodiment shown in FIG. 25 is a modification of steps 41 to 42 of the seventh embodiment.

When step 40 or 46 ends, the speed signals of the engine 30 and the clutch output shaft 44 are fetched from the engine speed sensor 39 and the clutch speed sensor 58. Simultaneously, in order to adjust the engine speed to the rotational speed of the clutch output shaft 44, the psuedo accelerator signal is supplied from the output port 74 of the control unit 52 to the engine controller 65, and the control signal, as the engine speed increase/decrease signal, is supplied to the solenoid actuator 38 so as to adjust the rotational speeds. Then, the control unit 52 selects the engine-clutch synchronizing allowable speed x corresponding to the target transmission range (in this case, the transmission range shifting down in step 40) (step 41a). Note that engine-clutch synchronizing allowable speed x for each transmission range is stored in the memory 67 in advance, and is shown in Table 1 below.

TABLE 1

| Target Transmission Range | Synchronizing Allowable Rotation Speed x |
| --- | --- |
| 1 | 10 rpm |
| 2 | 50 |
| 3 | 100 |

The CPU 66 receives the detection signals of the engine speed N and the clutch speed N1 from the engine speed sensor 39 and the clutch speed sensor 45, respectively, and checks if the speed difference $|N-N1|$ therebetween is the synchronizing allowable speed x or lower (step 41b). If NO in step 41b, the flow returns to step 41, and the speed adjust control between the engine and the clutch is repeated. However, if YES in step 41b, i.e., when the speed difference $|N-N1|$ is the synchronizing allowable speed x or lower, and uncomfortable shock due to clutch engagement can be avoided, the control unit 52 supplies the ON (open) control signal to the exhaust solenoid valve 50 for a predetermined period of time, thereby engaging the clutch (step 42). Then, the flow returns.

When the shift up or down operation is performed in the designation transmission ranges (N, 1, 2, 3) and the transmission operation is performed in the selective transmission range (D), the engine-clutch synchronizing allowable speed x corresponding to the target transmission range is selected in step (41a) and, when the speed difference between the engine speed N and the clutch speed N1 falls within the allowable speed area $\pm x$ (step 41b), the clutch is controlled to be engaged (step 42). Therefore, the clutch 31 can be switched to the engaged state without generating a large shock when the gear position is changed to the low speed range, and without requiring extra control time for speed adjustment in addition to the effect of shock prevention when the gear position is changed to the high speed range.

A ninth embodiment shown in FIG. 26 is a modification of the emergency circuit 81 of the first embodiment. The emergency circuit 81 supplies control signals to the solenoid valves 53 of the gear shift unit 51, the intake solenoid valve 49 for driving the air cylinder 42, and the exhaust solenoid valve 50. Note that FIG. 26 shows electrical connections among the emergency circuit 81, the control unit 52, solenoid valves 49, 50a and 50b as clutch actuators, and solenoid valves 53a to 53f of the gear shift unit 51. Referring to FIG. 26, a case will be described wherein the two exhaust solenoid valves 50a and 50b are used. In this case, the intake solenoid valve 49 and one exhaust solenoid valve 50a are normally closed valves, and the other exhaust solenoid valve 50b is a normally open valve. The emergency circuit 81 is provided with the timer circuit 82. The timer circuit 82 comprises three transistors Tr·X, Tr·Y and Tr Z for driving the intake/exhaust solenoid valves 49, 50a and 50b, timers 83, 84 and 85 for operating the transistors Tr·X, Tr·Y and Tr·Z for different preset times t1, t2 and t3, respectively, logic elements ic-7 to ic-4, and a duty circuit 86 for generating pulse signals of an arbitrary duty ratio so as to turn on/off the transistor Tr·Y. During the time t1 set by the timer 83, the intake solenoid valve 49 is opened and the compressed air is supplied to the air chamber 46 of the air cylinder 42 so as to move the clutch disk 41 from the engaged state to the disengaged state. During the time t2 set by the timer 84, the exhaust solenoid valve 50a is opened, and the compressed air in the air chamber of the air cylinder 42 is released so as to move the clutch disk 41 from the disengaged state to the half-engaged state. Furthermore, during the time t3 set by the timer 85, the exhaust solenoid valve 50a is open/close controlled in accordance with the duty ratio (e.g., 20%) of the pulse signal generated by the duty circuit 86, the compressed air in the air chamber 46 of the air cylinder 42 is gradually released so as not to generate large shock due to the clutch engagement, and the clutch disk 41 is completely engaged.

When the CPU 65, for example, malfunctions and various control functions of the control unit 52 are disabled, the driver manually operates the emergency switch 80 in the direction of 2nd (second speed) or R (reverse) by one range. The control operation of the emergency circuit 81 shown in FIG. 12 will be described when the emergency switch 80 is operated in the direction of 2nd. When the switch 80 is set in the first range, current switching relays R1 to R4 are energized through a diode D1, the duty circuit 86 is grounded, and the timer 83 and the inverter ic-3 are grounded. Thus, a power source line from a battery E for operating the intake/exhaust solenoid valves 49, 50 and 50, and the solenoid valves 53a to 53f for gear shift is switched from a normal power supply line V1 to an emergency line VE. The transistor Tr·X is driven so as to correspond to the preset time t1 by the timer 83, and the transistor Tr·Z is driven through the inverter ic-3. In this case, since the intake solenoid valve 49 is opened for the time t1, and the normally open solenoid valve 50b is closed, the clutch disk 41 is actuated from the engaged state to the disengaged state in a direction indicated by arrow B. When the switch 80 is sequentially switched from the second range up to the fourth range, the emergency circuit 81 drives the solenoid valves 53a to 53f of the gear shift unit 51 so as to correspond to the above switched ranges. In the second range, the solenoid valves 53a and 53b are driven through the diodes D3 and D4 so that the shift direction of the shift pattern shown in FIG. 2 is neutral-controlled so as to adjust the gear position of the transmission 32 to the neutral range N. In the third range, the solenoid valves 53a, 53b, 53c and 53e are driven through diodes D5, D6, D7 and D8 so that the select direction of the shift pattern is neutral-controlled so as to align the gear position along the 2nd-3rd line. In the fourth range, the solenoid valves 53b, 53c and 53e are driven through diodes D9, D10 and D11 so that the shift direction is controlled in the direction of 2nd so as to change the gear position to the second speed.

Thereafter, when the switch 80 is switched to the fifth range, the timers 84 and 85 are energized through a diode D12. Thus, the transistors Tr·Y is driven for the preset time t2 by the timer 84 through the OR gate ic-1, and is turned on/off through the OR gate ic-1 and the AND gate ic-2 for the preset time t3 by the timer 85 in accordance with the duty ratio of the pulse signal from the duty circuit 86. Since the timer 85 is turned on, the transistor Tr·Z is continously driven. In this case, the normally closed exhaust solenoid valve 50a is opened for the time t2, and the clutch disk 41 is actuated from the engaged state to the half engaged state in a direction indicated by arrow A. Thereafter, the exhaust solenoid valve 50a is opened/closed with reference to a time ratio corresponding to the duty ratio of the pulse signal until the time t3 elapses, and the compressed air in the air chamber 46 of the air cylinder 42 is gradually released. As a result, the clutch disk 41 is further moved in the direction indicated by arrow A, i.e., from the half engaged state to the fully engaged state without accompanying shock. When power supply from the timer 85 is stopped, the transistor Tr·Z is turned off and the exhaust solenoid valve 50b is then opened. The compressed air in the air chamber 46 of the air cylinder 42 is completely released, and the clutch disk 41 is completely engaged with the flywheel 40.

When the emergency switch 80 is operated in the direction of R, the gear position of the transmission 32 is changed to the reverse range R under the same control as the second-speed transmission control.

Thus, when the control unit 52 malfunctions, emergency running can be performed by either the second speed or the range R.

In this manner, when the first or fifth range of the switch 80 is selected, the clutch is quickly and precisely disengaged, and is smoothly engaged in the same manner as in a manual clutch operation by the timer circuit comprising a combination of the timers 83 to 85 and the duty circuit 86. Therefore, even when emergency running is performed, rapid and smooth clutch operation can be achieved.

During the time t1 when the timer 83 is enabled, since an "H" level signal is continuously supplied to the timers 84 and 85 through the OR gate ic-4, even if the switch 80 is switched to the fifth range during the time t1 by the timer 83, the timers 84 and 85 cannot be operated.

In the first embodiment, the exhaust solenoid valve 50 controls the pressure in the air cylinder 42 under duty control. However, the valve 50 can comprise a three-direction switching valve, and the air chamber 46 communicates with the outer air through an orifice when the clutch 31 is gradually engaged. On the other hand, when pressure in the air chamber 46 is decreased to the atmospheric pressure after the clutch 31 is engaged, the air chamber 46 is communicated with a path having no orifice.

A tenth embodiment shown in FIG. 27 shows a duty control circuit for engaging the clutch built into the interface 68 of the control unit 52 according to the first embodiment. The circuit comprises a duty ratio switching circuit 90. The switching circuit 90 selects any one of transistors Q1 to Q4 so as to turn off the selected one in accordance with an accelerator pedal opening degree detected by the accelerator load sensor 60, e.g., the clutch engagement control signal supplied from the CPU 66. Collector resistors R1 to R4 of the transistors Q1 to Q4 are set to have resistances differing stepwise, and each voltage divided output is supplied to a pulse signal generator 91. The pulse signal generator 78 generates a pulse signal of a duty ratio α corresponding to a resistance ratio of a selected one of the collector resistors R1 to R4 of the transistors Q1 to Q4 to be turned off to a reference resistance Rd, and the pulse signal is supplied to the exhaust solenoid valve 50.

An emergency exhaust solenoid valve is provided in parallel with the exhaust solenoid valve 50 of the first embodiment so that the air chamber 46 is opened to the outer atmosphere through an orifice when the solenoid valve 50 cannot be duty controlled.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. An automatic transmission apparatus for a vehicle comprising:
    a parallel shaft type gear automatic transmission connected through a clutch to an engine mounted on a vehicle;
    an actuator for engaging/disengaging said clutch;
    actuator control means for controlling an operation of said actuator;
    clutch position detecting means for detecting engaging/disengaging of said clutch;
    gear ratio detecting means for generating a signal corresponding to a gear ratio of said parallel shaft type gear automatic transmission;
    change speed means for changing the meshing state of said parallel shaft type gear automatic transmission;
    operating condition detecting means for detecting operating conditions of at least one of said vehicle, said engine and said parallel shaft type gear automatic transmission;
    gear ratio selecting means for supplying a change signal to said change speed means so as to change for a desired gear ratio in said parallel shaft type gear automatic transmission in accordance with an operation by a driver; and
    automatic transmission control means having;
    load detecting means for detecting a load of said engine in accordance with a changing rate of the engine speed;
    first clutch control means for operating said actuator control means so as to actuate said clutch from a disengaged state to a half engaged state in accordance with an accelerator position signal from said operating condition detecting means;
    second clutch control means including a first control function for operating said actuator control means so as to gradually engage said clutch in correspondence to the accelerator position signal from said operating condition detecting means when the changing rate of the engine speed detected by the load detecting means is a first preset value or less and stop engaging said clutch when the changing rate equals or exceeds a second preset value, and a second control function for operating said actuator control means so as to hold said clutch when the changing rate exceeds the first preset value and is less than a third preset value, and to move said clutch in a disengaging direction when the changing rate exceeds the first preset value and equals or exceeds the third preset value and stop moving said clutch when the changing rate is a fourth preset value or less when said clutch moves in the disengaging direction; and
    third clutch control means for operating said actuator control means so as to fully engage said clutch when the difference between an engine speed and an output shaft speed of said clutch, becomes lower than a predetermined value after operation of said second clutch control means.

2. An automatic transmission apparatus for a vehicle according to claim 1, characterized in that said clutch position detecting means comprises a stroke sensor for detecting a stroke of said actuator.

3. An automatic transmission apparatus for a vehicle according to claim 1, characterized in that said actuator comprises an air cylinder device, and said clutch position detecting means comprises a pressure sensor for detecting a pneumatic pressure in said air cylinder device.

4. An automatic transmission apparatus for a vehicle according to claim 1, characterized in that the half engaged state of said clutch is detected by said first clutch control means when an engine speed detected by said operating condition detecting means is increased from idling speed and reaches a maximum value.

5. An automatic transmission apparatus for a vehicle according to claim 1, characterized in that said first clutch control means has a discrimination function for discriminating whether or not the engine speed is increased, and a third control function for operating said actuator control means so as to gradually engage said clutch when it is detected by said discrimination function that the engine speed is increased, and for initiating said second clutch control means when it is detected that the engine speed begins to decrease.

6. An automatic transmission apparatus for a vehicle according to claim 1, characterized in that said third clutch control means comprises a fourth control function for operating said actuator control means so as to fully engage said clutch when the difference between the engine speed and the clutch speed produced by the operating condition detecting means is at a predetermined value or less after said second clutch control means is operated, and a wear detecting function for detecting wear of said clutch from the engine speed and the clutch speed after said actuator control means is operated so as to fully engage said clutch.

7. An automatic transmission apparatus for a vehicle according to claim 1, characterized in that said automatic transmission control means has means for enabling actuating said first clutch control means when said clutch position detecting means producing a clutch disengagement signal and when signals produced by said gear ratio selecting means and said gear ratio detecting means coincide.

8. An automatic transmission apparatus for a vehicle according to claim 1, characterized in that said automatic transmission control means comprises engine stop detecting means for detecting an engine stop by an engine speed signal produced by said operating condition detecting means, and starter motor control means for operating a starter motor when a coincidence between the gear ratio of said gear ratio detecting means and said gear ratio selecting means is detected.

9. An automatic transmission apparatus for a vehicle according to claim 1, characterized in that said automatic transmission control means comprises engine stop preventing means for operating said actuator control means so as to disengage said clutch when the accelerator position signal produced by said operating condition detecting means is at a predetermined value or more and the engine speed is a first engine speed or less, or when the accelerator position signal is lower than the predetermined value and the engine speed is a second engine speed or less, which is higher than the first engine speed.

10. An automatic transmission apparatus for a vehicle comprising:
a parallel shaft type gear automatic transmission connected through a clutch to an engine mounted on a vehicle;
an actuator for engaging/disengaging said clutch;
actuator control means for controlling an operation of said actuator;
clutch position detecting means for detecting engagement/disengagement of said clutch;
gear ratio detecting means for generating a signal corresponding to a gear ratio of said parallel shaft type gear automatic transmission;
change speed means for changing the meshing state of said parallel shaft type gear automatic transmission;
operating condition detecting means for detecting operating conditions of at least one of said vehicle, said engine and said parallel shaft type gear automatic transmission;
a change speed operating level for selecting an automatic change speed position for automatically changing a desired gear ratio in said parallel shaft type gear automatic transmission according to an accelerator pedal position, a vehicle speed and an engine speed detected by said operating condition detecting means, and a designated change speed position for changing a designated gear ratio in said parallel shaft type gear automatic transmission; and
automatic transmission control means including:
gear ratio selecting means for supplying a change speed signal to said change speed means so as to change to a desired gear ratio in said parallel shaft type gear automatic transmission in accordance with an operating signal generated by said change speed operating lever, and for operating said actuator control means to move said clutch to a disengaged position, and for holding an engine speed, and for supplying to said change speed means a signal for changing a gear ratio down, one by one, when the operating signal produced by said change speed operating lever is changed from the automatic change speed position to the designated change speed position; and
coincidence control means for supplying a pseudo accelerator signal to said engine to cause the engine speed to substantially coincidence with an output shaft speed of said clutch when the gear ratio selecting means indicates that the gear ratio has been changed down by one to a new gear ratio and for supplying a signal to said actuator control means to fully engage said clutch when an allowable speed difference exists between said engine and said clutch output shaft, said allowable speed difference being determined according to the new gear ratio.

11. An automatic transmission apparatus for a vehicle according to claim 10, characterized in that said automatic transmission control means comprises inhibiting means for inhibiting an operation of said change speed means when the vehicle speed signal produced by said operating condition detecting means is at a predetermined value or more and a brake operation signal generated by said operating condition detecting means and a clutch engagement signal generated by said clutch position detecting means are received.

12. An automatic transmission apparatus for a vehicle comprising:
a parallel shaft type gear automatic transmission connected through a clutch to an engine mounted on a vehicle;
an actuator for engaging/disengaging said clutch;
actuator control means for controlling an operation of said actuator;

clutch position detecting means for detecting engagement/disengagement of said clutch;
gear ratio detecting means for generating a signal corresponding to a gear ratio of said parallel shaft type gear automatic transmission;
change speed means for changing the meshing state of said parallel shaft type gear automatic transmission;
operating condition detecting means for detecting operating conditions of at least one of said vehicle, said engine and said parallel shaft type gear automatic transmission;
a change speed operating lever for selecting an automatic change speed position for automatically changing a desired gear ratio in said parallel shaft type gear automatic transmission according to an accelerator pedal position, a vehicle speed and an engine speed detected by said operating condition detecting means, and a designated change speed position for changing said parallel shaft type gear automatic transmission to a designated gear ratio;
automatic transmission control means having gear ratio selecting means for supplying a change speed signal to said change speed means so as to change for a desired gear ratio in said parallel shaft type gear automatic transmission in accordance with an operation signal generated by said change speed operating lever, and clutch control means for supplying a signal to said actuator control means so as to disengage said clutch, by the change speed signal, and to fully engage said clutch when said gear ratio detecting means detects that the transmission operation is completed; and
emergency operation means distinct from said automatic transmission control means, manually operated when said automatic transmission control means malfunctions, for changing said parallel shaft type gear automatic transmission to a desired low speed gear ratio via a neutral gear position by directly actuating said changed speed means, after the clutch is disengaged, and for fully engaging said clutch by means of said actuator control means.

13. An automatic transmission apparatus for a vehicle comprising:
a parallel shaft type gear automatic transmission connected through a clutch to an engine mounted on a vehicle;
an actuator for engaging/disengaging said clutch;
actuator control means for controlling an operation of said actuator;
clutch position detecting means for detecting engagement/disengagement of said clutch;
gear ratio detecting means for generating a signal corresponding to a gear ratio of said parallel shaft type gear automatic transmission;
change speed means for changing the meshing state of said parallel shaft type gear automatic transmission;
operating condition detecting means for detecting operating conditions of at least one of said vehicle, said engine and said parallel shaft type gear automatic transmission;
gear ratio selecting means for supplying a change speed signal to said change speed means so as to change for a desired gear ratio in said parallel shaft type gear automatic transmission in accordance with an operation by a driver; and automatic transmission control means comprising
load detecting means for detecting a load state of said engine;
first clutch control means for operating said actuator control means so as to actuate said clutch from a disengaged state to a half engaged state in accordance with an accelerator position signal from said operating condition detecting means;
second clutch control means for operating said actuator control means so as to gradually engage said clutch when a load signal from said load detecting means is below a preset value after operation of said first clutch control means, and to disengage said clutch so as to reduce the load of said engine when the preset value is exceeded;
third clutch control means for operating said actuator control means so as to fully engage said clutch when the difference between an engine speed and an output shaft speed of said clutch, detected by said operating condition detecting means, becomes lower than a predetermined value after operation of said second clutch control means;
means for enabling actuation of said first clutch control means when said clutch position detecting means produces a clutch disengagement signal and when signals produced by said gear ratio selecting means and said gear ratio detecting means coincide, said enabling means having a first enable function for detecting the coincidence of the signals produced by said gear ratio selecting means and said gear ratio detecting means and the clutch disengagement signal produced by said clutch position detecting means, and a storage function for storing a half engaged position of said clutch after moving said clutch in the disengaging direction from the fully engaged position when the gear ratio signal produced by said gear ratio detecting means is neutral; and
said first clutch control means operates said actuator control means so as to move said clutch from a disengaged state to the half engaged position stored in said storage function in accordance with the accelerator position signal produced by said operation condition detecting means when the gear ratio signal produced by said gear ratio detecting means is other than neutral.

14. An automatic transmission apparatus for a vehicle comprising:
a parallel shaft type gear automatic transmission connected through a clutch to an engine mounted on a vehicle;
an actuator for engaging/disengaging said clutch;
actuator control means for controlling an operation of said actuator;
clutch position detecting means for detecting engagement/disengagement of said clutch;
gear ratio detecting means for generating a signal corresponding to a gear ratio of said parallel shaft type gear automatic transmission;
change speed means for changing the meshing state of said parallel shaft type gear automatic transmission;
operating condition detecting means for detecting operating conditions of at least one of said vehicle, said engine and said parallel shaft type gear automatic transmission;

gear ratio selecting means for supplying a change speed signal to said change speed means so as to change for a desired gear ratio in said parallel shaft type gear automatic transmission in accordance with an operation by a driver; and automatic transmission control means comprising:

load detecting means for detecting a load state of said engine;

first clutch control means for operating said actuator control means so as to actuate said clutch from a disengaged state to a half engaged state in accordance with an accelerator position signal from said operating condition detecting means;

second clutch control means for operating said actuator control means so as to gradually engage said clutch when a load signal from said load detecting means is below a preset value after operation of said first clutch control means, and to disengage said clutch so as to reduce the load of said engine when the preset value is exceeded;

third clutch control means for operating said actuator control means so as to fully engage said clutch when the difference between an engine speed and an output shaft speed of said clutch, detected by said operating condition detecting means, becomes lower than a predetermined value after operation of said second clutch control means;

engine stop detecting means for detecting an engine stop by an engine speed signal produced by said operating condition detecting means; and starter motor control means for operating a starter motor when a coincidence between the gear ratio of said gear ratio detecting means and said gear ratio selecting means is detected, said engine start control means comprises engine stop detecting means for detecting an engine stop by an engine speed signal produced by said operating condition detecting means, and storage means for storing the half engaged position calculated from the fully engaged position of the clutch, after moving said clutch to a fully engaged position when the engine stopped.

* * * * *